United States Patent
Noheji

(10) Patent No.: US 8,971,724 B2
(45) Date of Patent: Mar. 3, 2015

(54) OPTICAL TRANSMISSION APPARATUS AND CHARACTERISTIC COMPENSATION METHOD

(71) Applicant: Fujitsu Limited, Kawasaki (JP)

(72) Inventor: Kiyotoshi Noheji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 13/714,591

(22) Filed: Dec. 14, 2012

(65) Prior Publication Data

US 2013/0243442 A1  Sep. 19, 2013

(30) Foreign Application Priority Data

Mar. 16, 2012 (JP) ................................. 2012-059715

(51) Int. Cl.
*H04B 10/58* (2013.01)
*H04B 10/2569* (2013.01)
*H04B 10/2513* (2013.01)

(52) U.S. Cl.
CPC .......... *H04B 10/58* (2013.01); *H04B 10/25133* (2013.01); *H04B 10/2569* (2013.01)
USPC ............. 398/192; 398/147; 398/208; 398/79; 356/73.1

(58) Field of Classification Search
USPC .......................................... 398/192, 147, 79
See application file for complete search history.

(56) References Cited

U.S. PATENT DOCUMENTS

| 2001/0046076 A1* | 11/2001 | Kim et al. ...................... 359/124 |
| 2003/0039013 A1* | 2/2003 | Jones et al. ................... 359/161 |
| 2003/0223760 A1* | 12/2003 | Takahara et al. .............. 398/147 |
| 2004/0156038 A1* | 8/2004 | Cao ............... 356/73.1 |
| 2008/0056726 A1* | 3/2008 | Sugiya et al. ................. 398/147 |
| 2009/0175629 A1* | 7/2009 | Liu et al. ...................... 398/147 |
| 2010/0196017 A1 | 8/2010 | Tanimura et al. |
| 2012/0148265 A1* | 6/2012 | Chang et al. .................. 398/208 |

FOREIGN PATENT DOCUMENTS

| JP | 2004-7150 | 1/2004 |
| JP | 2010-178222 | 8/2010 |

* cited by examiner

*Primary Examiner* — David Payne
*Assistant Examiner* — Omar S Ismail
(74) *Attorney, Agent, or Firm* — Staas & Halsey LLP

(57) ABSTRACT

A characteristic compensation method includes obtaining compensation information when degradation of a transmission characteristic of an optical transmission path of a received light signal is compensated for by using digital signal processing with respect to an electric signal obtained by photoelectrically converting the light signal, calculating an compensation value for a characteristic compensation device that optically compensates for degradation of the transmission characteristic to start characteristic compensation, based on the compensation information with respect to the light signal, setting the compensation value in the characteristic compensation device, and switching a state in which compensation is done using the digital signal processing to a state in which compensation is done using the characteristic compensation device after the setting of the compensation value is completed.

8 Claims, 16 Drawing Sheets

OPTICAL TRANSMISSION APPARATUS AND CHARACTERISTIC COMPENSATION METHOD

CROSS-REFERENCE TO RELATED APPLICATION

This application is based upon and claims the benefit of priority of the prior Japanese Patent Application No. 2012-059715, filed on Mar. 16, 2012, the entire contents of which are incorporated herein by reference.

FIELD

The embodiments discussed herein are related to an optical transmission apparatus and a characteristic compensation method.

BACKGROUND

Conventionally, as a type of optical transmission device, there is an optical reception apparatus that includes a distortion compensation apparatus configured to compensate, by using digital signal processing, for waveform distortion of a received light signal (for example, see Japanese Laid-open Patent Publication No. 2010-178222). In addition, there is a tunable dispersion compensator configured to make up for degradation of transmission quality caused by chromatic dispersion in the transmission path of a received light signal (for example, see Japanese Laid-open Patent Publication No. 2004-007150).

The delay amount when the waveform distortion of a received light signal is compensated for through digital signal processing is higher than the delay amount when the waveform distortion is optically compensated by using a tunable dispersion compensator or a polarization mode dispersion compensator. However, in recent years, for example, with finance-related traffic that is in high demand such as share price information, low latency (low delay) is desired. For the above-mentioned low-latency traffic, optical compensation may preferably be adopted instead of compensation based on digital signal processing.

Incidentally, when constructing and installing a optical transmission apparatus, an apparatus with a configuration that carries out compensation by using digital signal processing is installed in some cases, for example, because the apparatus is inexpensive, low latency is not desired, or the like. In this case, while the optical transmission apparatus is operating, when low latency is requested in a channel, compensation for the channel may be switched from compensation using digital signal processing to optical compensation.

However, when compensation using digital signal processing is switched to compensation based on a tunable dispersion compensator in an operating optical transmission apparatus, an initial value for compensation is decided by scanning a wide variable chromatic dispersion bandwidth, and the initial value is set in the tunable dispersion compensator. The same applies to when compensation using digital signal processing is switched to compensation by a polarization-mode dispersion compensator. An initial value is decided by scanning the polarization, and the initial value is set in the polarization-mode dispersion compensator. In either case, control for deciding the initial value is complicated, and it takes time to scan the variable chromatic dispersion bandwidth or the polarization. Therefore, there is a problem in that starting the signal flow after the switch takes time.

SUMMARY

According to an aspect of the embodiments, a transmission apparatus, comprising: a first switch that switches an optical transmission path of a received light signal to one of a first path and a second path in the transmission apparatus; a photoelectric transducer that converts the light signal output from the first path or the second path into an electric signal; a second switch that provides the electric signal output from the photoelectric transducer to one of a third path and a fourth path; an electronic processing unit that performs processing to compensate for degradation of an optical transmission characteristic of the light signal on the optical transmission path, the electronic processing unit outputting compensation information; and a controller that, when the first switch switches from the first path to the second path, performs control so that, based on the compensation information when the electronic processing unit compensates the transmission characteristic, an compensation value, which is for an optical characteristic compensation device to start characteristic compensation, is set in the optical characteristic compensation device that is inserted or is to be inserted into the second path, and that performs control to, after the setting of the compensation value has completed, switch the second switch from the third path to the fourth path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, with reference to the accompanying drawings, embodiments of an optical transmission apparatus and a characteristic compensation method will be described in detail. In descriptions on the respective embodiments below, similar components are assigned with the same reference signs, and redundant explanations are omitted.

Figure 1:
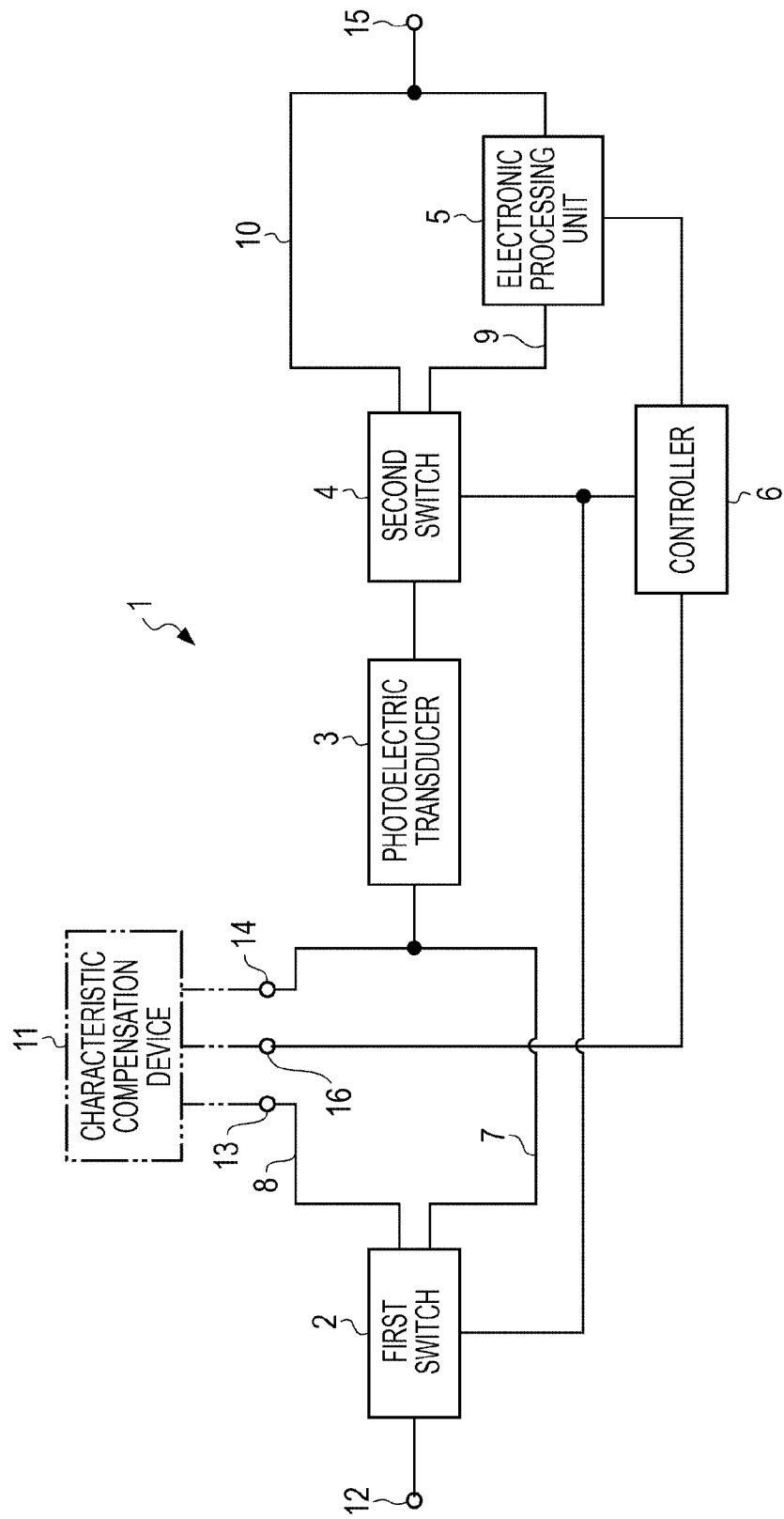
FIG. 1 is a block diagram of an example of a main part of a optical transmission apparatus according to an embodiment.
Figure 2:
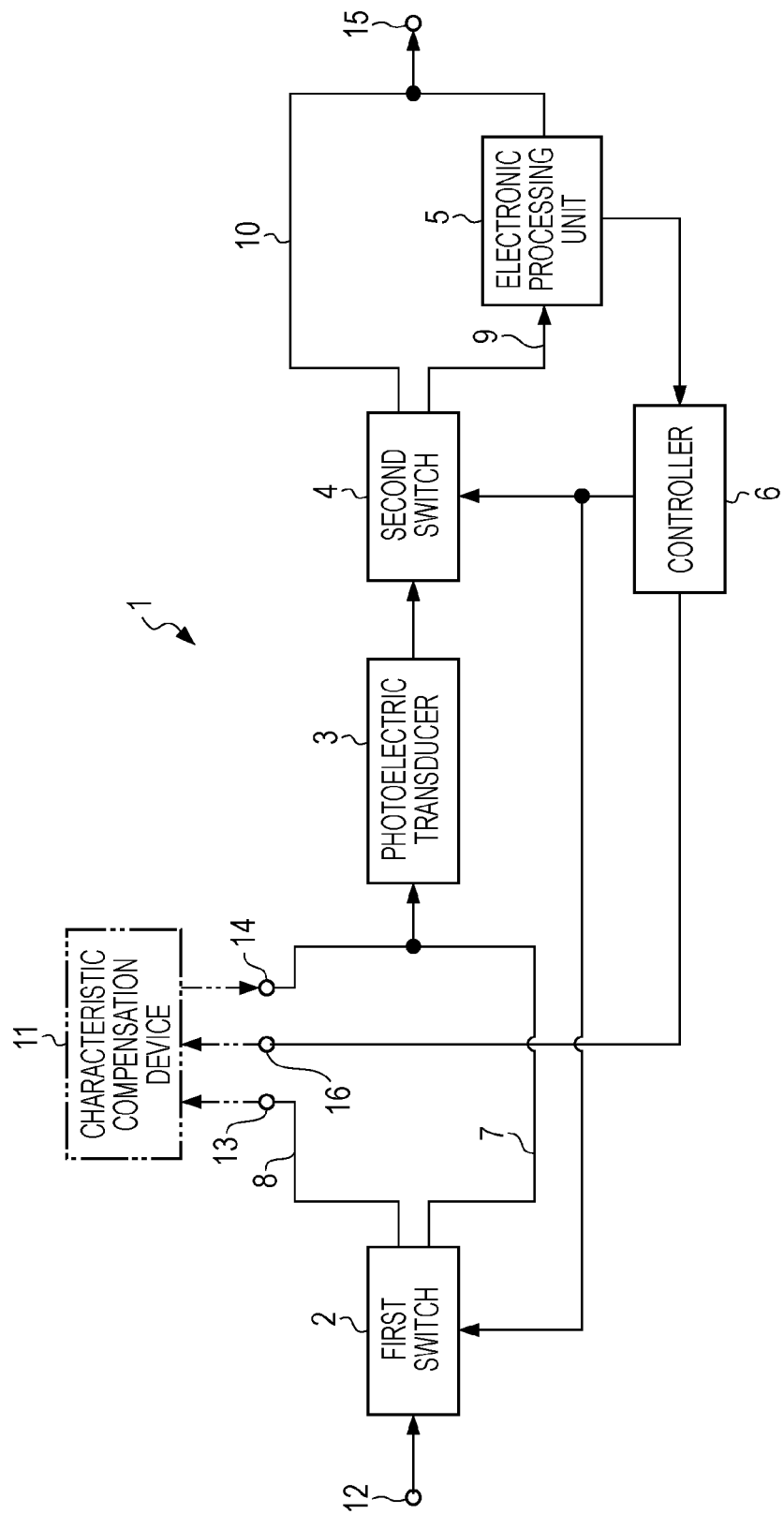
FIG. 2 is a block diagram of the flow of a signal in the optical transmission apparatus illustrated in FIG. 1.

FIG. 1 is a block diagram of an example of the main part of an optical transmission apparatus according to an embodiment. FIG. 2 is a block diagram of the flow of a signal in the optical transmission apparatus illustrated in FIG. 1. As illustrated in FIG. 1 and FIG. 2, an optical transmission apparatus 1 is provided with a first switch 2, a photoelectric transducer 3, a second switch 4, an electronic processing unit 5, and a controller 6. The electronic processing unit 5 may include at least one of digital signal processor (DSP), application specific integrated circuits (ASIC), and Field Programmable Gate Array (FPGA), for example. Also controller 6 may include at least one of digital signal processor (DSP), application specific integrated circuits (ASIC), and Field Programmable Gate Array (FPGA), for example.

The first switch 2 is connected to an optical input terminal 12. A light signal received by the optical transmission apparatus 1 from an optical transmission path is input to the optical input terminal 12. The first switch 2 switches the transmission path of the light signal input that is from the optical input terminal 12 into one of a first path 7 and a second path 8. Along the second path 8, an optical output terminal 13 and an optical input terminal 14 are provided. A characteristic compensation device 11 is connected to the optical output terminal 13 and the optical input terminal 14.

The characteristic compensation device 11 is a device configured to optically compensate for degradation of a transmission characteristic, for example, such as a chromatic dispersion or a polarization mode dispersion, which is caused when a light signal is propagated in an optical fiber that corresponds to an optical transmission path. An example of the characteristic compensation device 11 includes, for example, a chromatic dispersion compensator or a polarization mode dispersion compensator.

The characteristic compensation device 11 may already be connected to the optical output terminal 13 and the optical input terminal 14, and may be inserted into the second path 8. Alternatively, the characteristic compensation device 11 does not yet be connected to the optical output terminal 13 and the optical input terminal 14 when installing or beginning operation of the optical transmission apparatus 1, and may be connected and inserted into the second path 8 at a later time.

The light signal passing through the second path 8 while the characteristic compensation device 11 is inserted into the second path 8 is output from the optical output terminal 13 and input to the characteristic compensation device 11, passes through the characteristic compensation device 11 where degradation of a transmission characteristic is compensated for, and is thereafter output from the characteristic compensation device 11 and input to the optical input terminal 14. With respect to the light signal passing through the first path 7, compensation via a characteristic compensation device for the degradation of the transmission characteristic is not desired.

The photoelectric transducer 3 is connected to the first switch 2 and the optical input terminal 14. The photoelectric transducer 3 transduces the light signal passing through the first path 7 or the light signal passing through the second path 8 into an electric signal. The second switch 4 is connected to the photoelectric transducer 3. The second switch 4 switches the transmission path of the electric signal output from the photoelectric transducer 3 into either a third path 9 or a fourth path 10.

The electronic processing unit 5 performs a processing of compensating for degradation of a transmission characteristic in an electric signal that passes through the third path 9 by using digital signal processing. Digital signal processing to compensate for degradation of the transmission characteristic may possibly not be carried out on the electric signal passing through the fourth path 10. The electric signal output from the electronic processing unit 5 and the electric signal passing through the fourth path 10 are output from an output terminal 15 to be sent to a circuit in a later stage.

The controller 6 is connected to a control terminal 16 for the electronic processing unit 5, the first switch 2, the second switch 4, and the characteristic compensation device 11. The controller 6 obtains compensation information when the electronic processing unit 5 compensates for the degradation of the transmission characteristic from the electronic processing unit 5. An example of compensation information when the electronic processing unit 5 compensates for degradation of the transmission characteristic includes, for example, a residual dispersion value and the value of a residual polarization position. Based on compensation information, such as the residual dispersion value or the value of the residual polarization position that are obtained from the electronic processing unit 5, the controller 6 performs control so that an initial compensation value is set in the characteristic compensation device 11.

The initial compensation value is an initial value that is set in the characteristic compensation device 11 for the characteristic compensation device 11 to start compensating for degradation of the transmission characteristic. An example of the initial compensation value includes, for example, a value to compensate for the residual dispersion value and the value of the residual polarization position based on the residual dispersion value and the value of the residual polarization position when the electronic processing unit 5 compensates for degradation of the transmission characteristic.

For example, the controller 6 may calculate the initial compensation value based on compensation information obtained from the electronic processing unit 5 and output the initial compensation value to the control terminal 16. In this case, the characteristic compensation device 11 may set the initial compensation value, which is obtained from the control terminal 16, in the characteristic compensation device 11. Alternatively, the controller 6 may output compensation information obtained from the electronic processing unit 5 to the control terminal 16. In this case, the characteristic compensation device 11 may calculate the initial compensation value based on information obtained from the control terminal 16 and set the initial compensation value in the characteristic compensation device 11. Herein, description will be given with the assumption that the controller 6 sets the initial compensation value.

After the setting of the initial compensation value is completed in the characteristic compensation device 11, the controller 6 switches the first switch 2 from the first path 7 side to the second path 8 side and switches the second switch 4 from the third path 9 side to the fourth path 10 side at substantially the same time. As a result, the state of the optical transmission apparatus 1 is changed from a state where degradation of the transmission characteristic is compensated for by digital signal processing to a state where degradation is compensated for via the characteristic compensation device 11.

Figure 3:
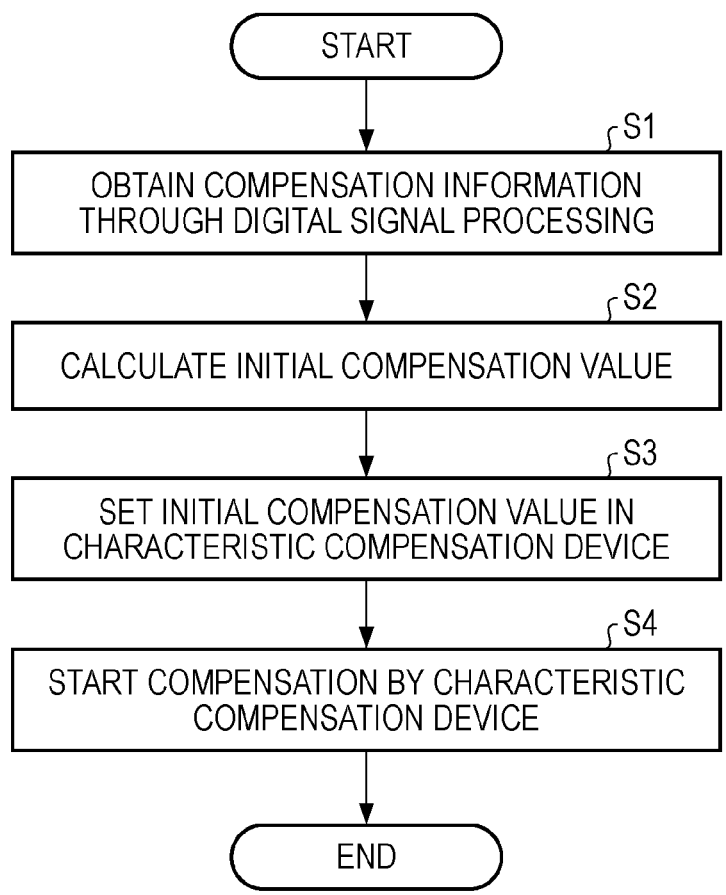
FIG. 3 is a flowchart illustrating a characteristic compensation method according to the embodiment.

FIG. 3 is a flowchart of a characteristic compensation method according to the embodiment. It is assumed that degradation of the transmission characteristic of the received light signals is compensated for by using digital signal processing in the electronic processing unit 5 and that the characteristic compensation device 11 is connected to the optical transmission apparatus 1.

As illustrated in FIG. 3, first, the controller 6 obtains compensation information when the degradation of the transmission characteristic is compensated for by using digital signal processing from the electronic processing unit 5 (step S1). Subsequently, based on the compensation information obtained in step S1, the controller 6 calculates initial compensation value for the characteristic compensation device 11 to start compensating for degradation of the transmission characteristic (step S2).

Subsequently, the controller 6 sets initial compensation value in the characteristic compensation device 11 (step S3). After the setting of the initial compensation value is completed, the controller 6 switches the first switch 2 from the first path 7 to the second path 8 and switches the second switch 4 from the third path 9 to the fourth path 10 at substantially the same time. As a result, the state of the optical transmission apparatus 1 is changed from a state where degradation of the transmission characteristic is compensated for by using digital signal processing to a state where degradation is compensated for by the characteristic compensation device 11, and compensation by the characteristic compensation device 11 is started (step S4).

According to the optical transmission apparatus 1 illustrated in FIG. 1, based on compensation information from when the degradation of the transmission characteristic is compensated for by using digital signal processing in the electronic processing unit 5, the initial compensation value set in the characteristic compensation device 11 is calculated. As a result, the initial compensation value is set in the characteristic compensation device 11 in a shorter time than when the initial compensation value is decided by scanning a wide variable chromatic dispersion bandwidth or scanning the polarization. Therefore, characteristic compensation via digital signal processing may be switched to the optical characteristic compensation in a shorter time than when the setting of the initial compensation value is carried out by scanning.

Figure 4:
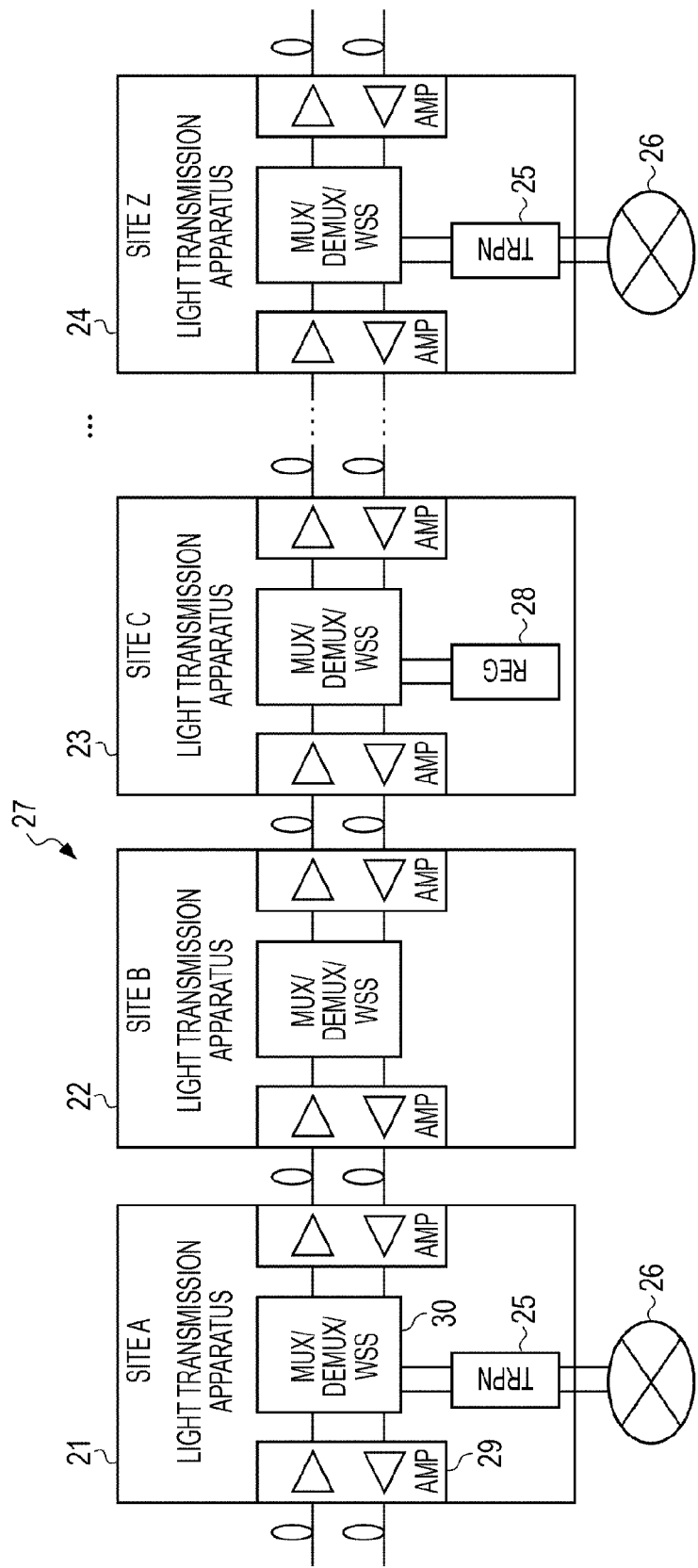
FIG. 4 is a block diagram of an example of an optical transmission system.

FIG. 4 is a block diagram of an example of an optical transmission system. As illustrated in FIG. 4, for example, in an optical transmission system in a wavelength division multiplexing (WDM) network, optical transmission apparatuses 21, 22, 23, and 24 of various configurations are connected via an optical transmission path such as optical fiber. For example, the optical transmission apparatuses 21 and 24 of a site A and a site Z are provided with a transponder (TRPN) 25.

The transponder 25 is provided with an optical transmitter and an optical receiver. The optical transmitter converts, for example, a signal received from a network 26 on a client side into a light signal and transmits the light signal to a WDM network 27, for example. The optical receiver converts, for example, the light signal received from the WDM network 27 into an electric signal and transmits the electric signal to the network 26 on the client side, for example.

The optical transmission apparatus 22 of a site B is a repeater and is configured to amplify and then transmit the received light signal. The optical transmission apparatus 23 of a site C is a regenerative repeater and is provided with a regenerator (REG) 28. A regenerator 28 converts the received light signal into an electric signal to reproduce a pulse to be thereafter converted again into an optical signal. In the WDM network 27, the respective optical transmission apparatuses 21, 22, 23, and 24 include an optical amplifier (AMP) 29 configured to compensate for transmission path loss, a dispersion compensator, and a wavelength division multiplexer/demultiplexer/wavelength selection switch (MUX/DEMUX/WSS) 30.

Figure 5:
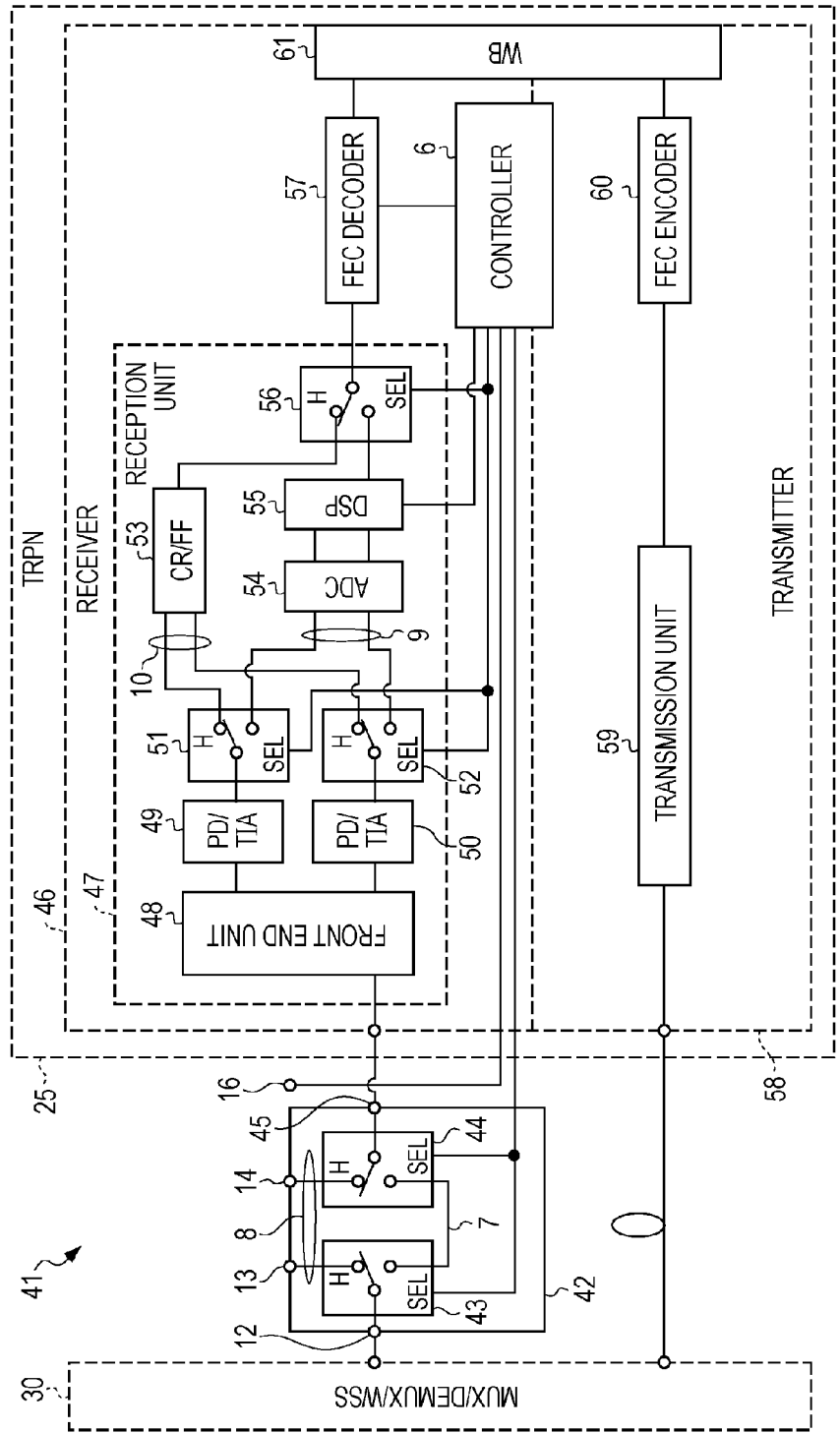
FIG. 5 is a block diagram of another example of the main part of the optical transmission apparatus according to the embodiment.
Figure 6:
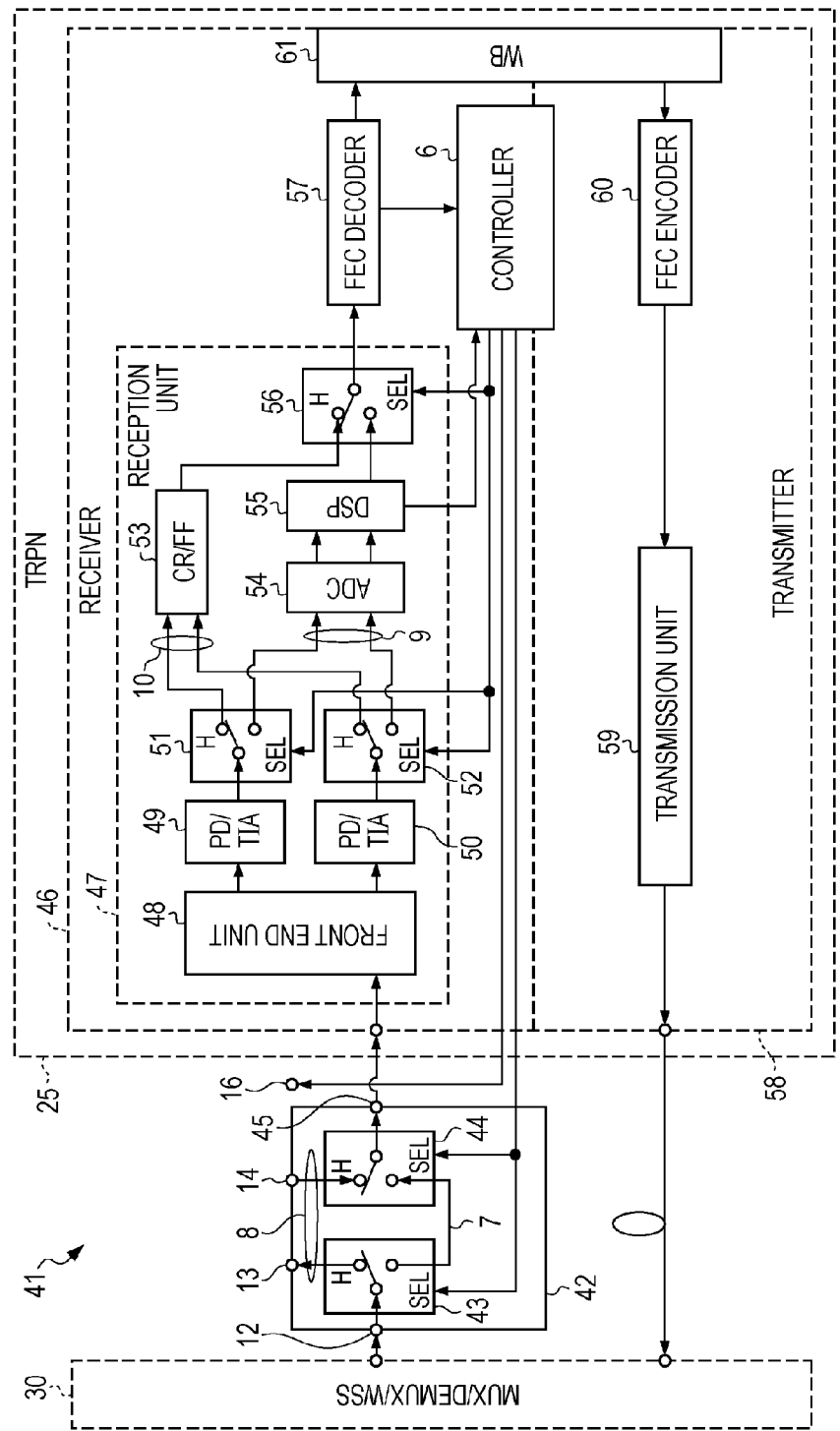
FIG. 6 is a block diagram of the flow of a signal in the optical transmission apparatus illustrated in FIG. 5.

FIG. 5 is a block diagram illustrating another example of the main part of the optical transmission apparatus according to the embodiment. FIG. 6 is a block diagram illustrating the flow of a signal in the optical transmission apparatus illustrated in FIG. 5. As illustrated in FIG. 5 and FIG. 6, an optical transmission apparatus 41 is provided, for example, with an optical switch unit 42 as the first switch. The optical switch unit 42 is provided with an output-side optical switch 43 and an input-side optical switch 44.

The input terminal of the output-side optical switch 43 is connected, for example, to the optical input terminal 12 to which the light signal is input from the wavelength division multiplexer/demultiplexer/wavelength selection switch 30. One output terminal of the output-side optical switch 43 (the H port) is connected to the optical output terminal 13 that is connected to the characteristic compensation device. The other output terminal of the output-side optical switch 43 (the L port) is connected to the input-side optical switch 44. The control terminal (SEL) of the output-side optical switch 43 is connected to the controller 6.

One input terminal of the input-side optical switch 44 (the H port) is connected to the optical input terminal 14 that is connected to the characteristic compensation device. To elaborate, a path leading from the H port of the output-side optical switch 43 via the characteristic compensation device to the H port of the input-side optical switch 44 serves as the second path 8. The other input terminal of the input-side optical switch 44 (the L port) is connected to the L port of the output-side optical switch 43. Specifically, a path leading from the L port of the output-side optical switch 43 to the L port of the input-side optical switch 44 serves as the first path 7.

The output terminal of the input-side optical switch 44 is connected to an optical output terminal 45 of the optical switch unit 42. The control terminal (SEL) of the input-side optical switch 44 is connected to the controller 6. The same control signal is input to the control terminal (SEL) of the output-side optical switch 43 and the control terminal (SEL) of the input-side optical switch 44 from the controller 6.

When the control signal that is input from the controller 6 to the control terminal (SEL) of the output-side optical switch 43 is, for example, the L level, the output-side optical switch 43 outputs the light signal that is input from the optical input terminal 12 to the L port. When the control signal that is input from the controller 6 to the control terminal (SEL) of the output-side optical switch 43 becomes, for example, the H level, the output-side optical switch 43 outputs the light signal that is input from the optical input terminal 12 to the H port.

When the control signal that is input from the controller 6 to the control terminal (SEL) of the input-side optical switch 44 is, for example, the L level, the input-side optical switch 44 outputs the light signal that is input from the L port of the output-side optical switch 43 to the optical output terminal 45 of the optical switch unit 42. When the control signal that is input from the controller 6 to the control terminal (SEL) of the input-side optical switch 44 becomes, for example, the H level, the input-side optical switch 44 outputs the light signal that is input to the H port to the optical output terminal 45 of the optical switch unit 42.

Specifically, when the control that is signal input from the controller 6 to both the control terminal (SEL) of the output-side optical switch 43 and the control terminal (SEL) of the input-side optical switch 44 is, for example, the L level, the light signal passes through the first path 7 to be sent to the transponder 25. When the control signal that is input from the controller 6 to both the control terminal (SEL) of the output-side optical switch 43 and the control terminal (SEL) of the input-side optical switch 44 becomes, for example, the H level, the light signal passes through the second path 8 to be sent to the transponder 25.

The transponder 25 is provided with a receiver 46 and a transmitter 58. The receiver 46 may be connected, for example, to the optical output terminal 45 of the optical switch unit 42. The receiver 46 receives the light signal that is output from the optical output terminal 45 of the optical switch unit 42. The transmitter 58 may be connected, for example, to the wavelength division multiplexer/demultiplexer/wavelength selection switch 30. The transmitter 58 transmits a light signal to the wavelength division multiplexer/demultiplexer/wavelength selection switch 30.

The receiver 46 is provided with a reception unit 47 and a forward error correction (FEC) decoder 57. The reception unit 47 generates an electric signal from the light signal received by the receiver 46. The reception unit 47 is provided, for example, with photoelectric transducers (PD/TIA) 49 and 50 that each includes a photodiode and a transimpedance amplifier. The photoelectric transducer 49 may be used, for example, for an in-phase channel, and the photoelectric transducer 50 may be used, for example, for an orthogonal channel.

The reception unit 47 is also provided, for example, with analog selectors 51 and 52 and a selector 56, as the second switch. In addition, the reception unit 47 is provided, for example, with an analog digital converter (ADC) 54 and a digital signal processor (DSP) 55, as the electronic processing unit. The reception unit 47 is also provided with a front end unit 48. Furthermore, the reception unit 47 is provided with a detour (CR/FF) 53 that includes a clock recovery circuit and a flip-flop.

The front end unit 48 demodulates the light signal received by the receiver 46 and outputs, for example, a light signal for the in-phase channel and a light signal for the orthogonal channel. The photoelectric transducer 49 for the in-phase channel and the photoelectric transducer 50 for the orthogonal channel are connected to the front end unit 48. The photoelectric transducer 49 for the in-phase channel transduces the light signal for the in-phase channel, which is output from the front end unit 48, into an electric signal and amplifies the electric signal using the transimpedance amplifier. The photoelectric transducer 50 for the orthogonal channel transduces the light signal for the orthogonal channel, which is output from the front end unit 48, into an electric signal and amplifies the electric signal using the transimpedance amplifier.

The input terminal of the analog selector 51 is connected to the photoelectric transducer 49, which is for the in-phase channel. One output terminal of the analog selector 51 (the H port) is connected to the detour circuit 53. The other output terminal of the analog selector 51 (the L port) is connected to the analog digital converter 54. The control terminal (SEL) of the analog selector 51 is connected to the controller 6.

An input terminal of the other analog selector 52 is connected to the photoelectric transducer 50, which is for the orthogonal channel. One output terminal of the analog selector 52 (the H port) is connected to the detour circuit 53. The other output terminal of the analog selector 52 (the L port) is connected to the analog digital converter 54. The control terminal (SEL) of the analog selector 52 is connected to the controller 6. The paths on the H port of each of the analog selectors 51 and 52 serve as the fourth path 10, and the paths on the L port of each of the analog selectors 51 and 52 serve as the third path 9.

In the detour circuit 53, the clock recovery circuit extracts the clock from the electric signal output from the H port of each of the analog selector 51 and the analog selector 52. A flip-flop synchronises the clocks extracted from the clock recovery circuit. The analog digital converter 54 converts the analog electric signal output from the L port of each of the analog selector 51 and the analog selector 52 into a digital signal.

The digital signal processor 55 performs calcuations based on the digital signal output from the analog digital converter 54 and compensates for an optical characteristic such as a residual dispersion and/or a polarization mode dispersion. The digital signal processor 55 also outputs, for example, the residual dispersion value and/or the residual polarization position value to the controller 6. Instead of the provision of the detour circuit 53, the clock recovery circuit that extracts the clocks and the flip-flop that establishes the synchronization may be included in the analog digital converter 54 and the digital signal processor 55.

One input terminal of the selector 56 (the H port) is connected to the detour circuit 53. The other input terminal of the selector 56 (the L port) is connected to the digital signal processor 55. The control terminal (SEL) of the selector 56 is connected to the controller 6. The same control signal is input from the controller 6 to the control terminal (SEL) for each of the analog selectors 51 and 52, and the selector 56.

When the control signal that is input from the controller 6 to each control terminal (SEL) of the analog selectors 51 and 52 and the selector 56 is, for example, at the L level, the selector 56 outputs the electric signal that has passed through the analog digital converter 54 and the digital signal processor 55. That is, the selector 56 outputs an electric signal whose optical characteristic has been compensated for by the digital signal processor 55.

When the control signal that is input from the controller 6 to each control terminal (SEL) of the analog selectors 51 and 52 as well as the selector 56 becomes, for example, the H level, the selector 56 outputs the electric signal that has passed through the detour circuit 53. That is, the selector 56 outputs an electric signal whose optical characteristic has been compensated for by the characteristic compensation device that is connected to the optical switch unit 42.

The FEC decoder 57 is connected to an output terminal of the selector 56. The FEC decoder 57 performs error correction processing on the electric signal output from the selector 56 and obtains a reception signal. The FEC decoder 57 outputs, for example, bit error information per unit time to the controller 6, as reception quality information. The reception signal output from the FEC decoder 57 is sent to the reception unit of a wide band transceiver (WB) 61. The wide band transceiver 61 transmits or receives a signal to or from the network on the client side.

The controller 6 outputs a control signal that controls the output-side optical switch 43, the input-side optical switch 44, the analog selectors 51 and 52, and the selector 56. When the control signal to both the output-side optical switch 43 and the input-side optical switch 44 is at the L level, the control signal to the analog selectors 51 and 52 and the selector 56 is also at the L level. When the control signal to both the output-side optical switch 43 and the input-side optical switch 44 becomes the H level, the control signal to the analog selectors 51 and 52 and the selector 56 also becomes the H level.

The controller 6 may calculate an initial compensation value based on a residual dispersion value or a residual polarization position value obtained, for example, from the digital signal processor 55 and output the calculated initial compensation value to the control terminal 16. Alternatively, the controller 6 may output the residual dispersion value and the value of the residual polarization position obtained, for example, from the digital signal processor 55 to the control terminal 16. Herein, description will be given assuming that the controller 6 calculates the initial compensation value to be output to the control terminal 16.

The controller 6 may also, for example, output the bit error information per unit time, which is obtained from the FEC decoder 57, to an administrator of the optical transmission system either via an interface that is not illustrated in the drawing of the optical transmission apparatus 41 or via the network on the client side. As a result, the administrator of the optical transmission system obtains the bit error information per unit time from the optical transmission apparatus 41 to obtain, for example, a Q value from the bit error information per unit time, and selects a characteristic compensation device in accordance with the Q value. Alternatively, the controller 6 may calculate, for example, a Q value based on the bit error information per unit time obtained from the FEC decoder 57.

When an administrator switches from a transmission system having a high delay amount to a transmission system having a low delay amount, for example, when the Q value is sufficiently satisfactory, the administrator may determine that not connecting a characteristic compensation device may be acceptable. The delay amount for when compensation of the optical characteristic is done using digital signal processing is higher than the delay amount for when compensation of the optical characteristic is done using a characteristic compensation device. Therefore, so that a transmission system having a high delay amount is switched to a transmission system having a low delay amount, a system where compensation of the optical characteristic is done using digital signal processing may be shifted to a system where compensation of the optical characteristic is done using a characteristic compensation device.

In addition, if the Q value is in a certain range, the administrator of the optical transmission system may decide to connect a tunable dispersion compensator that is cheaper than a polarization mode dispersion compensator. If the Q value is lower than a certain range, the administrator of the optical transmission system may decide to connect a polarization mode dispersion compensator. If the Q value is lower than a certain low range, the administrator of the optical transmission system may decide to connect both a tunable dispersion compensator and a polarization mode dispersion compensator.

The transmitter 58 is provided with a transmission unit 59 and an FEC encoder 60. The FEC encoder 60 is connected to the transmission unit of the wide band transceiver 61. The FEC encoder 60 adds redundancy information for use with error correction to a signal string output from the wide band transceiver 61. The transmission unit 59 converts the signal output from the FEC encoder 60 into a light signal to be output, for example, to the wavelength division multiplexer/demultiplexer/wavelength selection switch 30.

Figure 7:
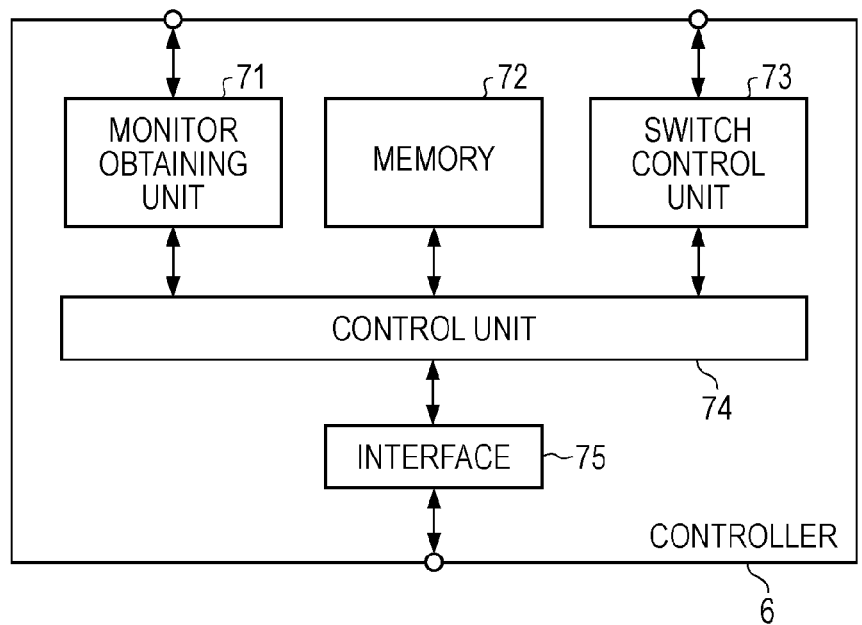
FIG. 7 is a block diagram of a controller in the optical transmission apparatus illustrated in FIG. 5.

FIG. 7 is a block diagram of a controller in the optical transmission apparatus illustrated in FIG. 5. As illustrated in FIG. 7, the controller 6 is provided with a monitor obtaining unit 71, a memory 72, a switch control unit 73, a control unit 74, and an interface 75. The monitor obtaining unit 71, memory 72, switch control unit 73, and the interface 75 are connected to the control unit 74.

The monitor obtaining unit 71 is connected to the digital signal processor 55 of the reception unit 47. The monitor obtaining unit 71 obtains, for example, a monitor value such as the residual dispersion value or the residual polarization position value from the digital signal processor 55. The memory 72 holds the monitor value obtained from the digital signal processor 55.

The switch control unit 73 is connected to each control terminal (SEL) of the analog selectors 51 and 52 and the selector 56 of the reception unit 47. The switch control unit 73 outputs a control signal that controls the switching of each of the analog selectors 51 and 52 and the selector 56 of the reception unit 47.

The interface 75 is connected to another unit. An example of another unit includes, for example, a monitoring control circuit, the optical switch unit 42, or the characteristic compensation device connected to the optical switch unit 42. The control unit 74 controls the monitor obtaining unit 71, memory 72, switch control unit 73, and the interface 75. In addition, the control unit 74 performs calculations to obtain the initial compensation value based on the monitor value obtained by the monitor obtaining unit 71. The switch control unit 73 and the control unit 74 are realized, for example, by using a common processor and memory or individual processors and memories.

Figure 8:
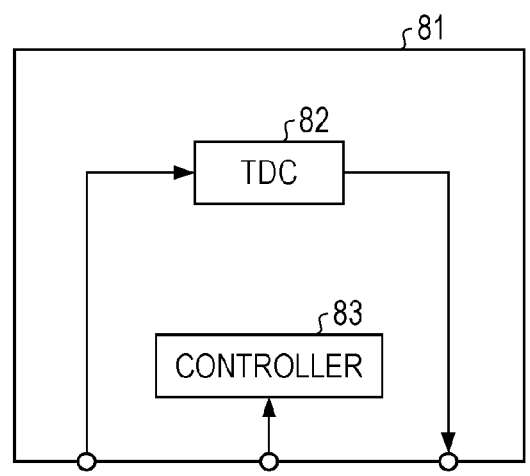
FIG. 8 is a block diagram of an example of a characteristic compensation device.

FIG. 8 is a block diagram that depicts an example of the characteristic compensation device. As illustrated in FIG. 8, the characteristic compensation device 81 is provided with a tunable dispersion compensator (TDC) 82 and a controller 83. The controller 83 is realized, for example, by utilizing a processor and memory. The tunable dispersion compensator 82 is connected to the optical output terminal 13 and the optical input terminal 14 of the optical switch unit 42. The light signal output from the optical output terminal 13 of the optical switch unit 42 passes through the tunable dispersion compensator 82 to be output to the optical input terminal 14 of the optical switch unit 42.

The controller 83 is connected to the controller 6 of the transponder 25 via the control terminal 16 of the optical transmission apparatus 41. The controller 83 sets the initial compensation value sent from the controller 6 of the transponder 25 in the tunable dispersion compensator 82. When the residual dispersion value is sent from the controller 6 of the transponder 25, the controller 83 may calculate an initial compensation value based on the residual dispersion value and set the calculated initial compensation value in the tunable dispersion compensator 82. By connecting the characteristic compensation device 81 illustrated in FIG. 8 to the optical transmission apparatus 41, degradation of the transmission characteristic caused by the chromatic dispersion may be compensated for.

Figure 9:
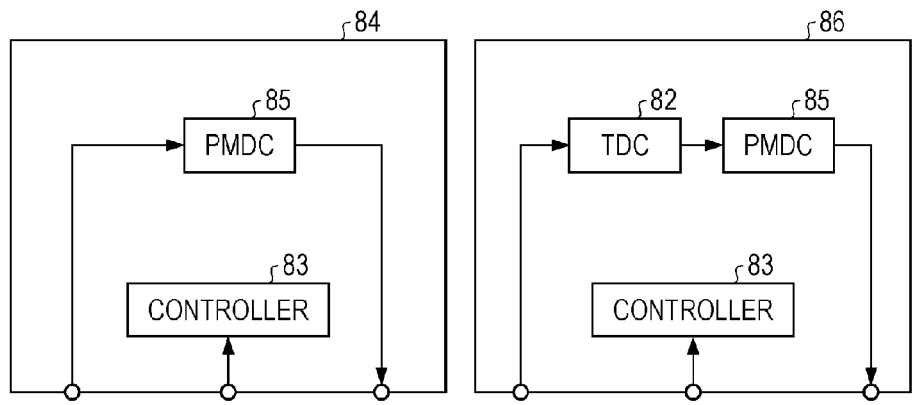
FIG. 9 is a block diagram of another example of the characteristic compensation device.

FIG. 9 is a block diagram of another example of the characteristic compensation device. As illustrated in FIG. 9, a characteristic compensation device 84 is provided with a polarization mode dispersion compensator (PMDC) 85 and the controller 83. The polarization mode dispersion compensator 85 is connected to the optical output terminal 13 and the optical input terminal 14 of the optical switch unit 42. The light signal output from the optical output terminal 13 of the optical switch unit 42 passes through the polarization mode dispersion compensator 85 to be output to the optical input terminal 14 of the optical switch unit 42.

With the characteristic compensation device 84 illustrated in FIG. 9, the controller 83 sets the initial compensation value sent from the controller 6 of the transponder 25 in the polarization mode dispersion compensator 85. When a value of the residual polarization position is sent from the controller 6 of the transponder 25, the controller 83 may calculate an initial compensation value based on the value of the residual polarization position and set the calculated initial compensation value in the polarization mode dispersion compensator 85. By connecting the characteristic compensation device 84 illustrated in FIG. 9 to the optical transmission apparatus 41, degradation of the transmission characteristic caused by the polarization mode dispersion may be compensated for.

Figure 10:
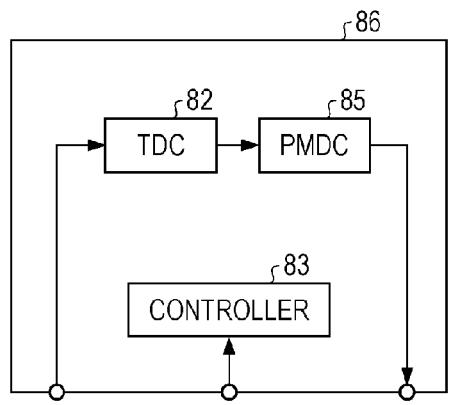
FIG. 10 is a block diagram of yet another example of the characteristic compensation device.

FIG. 10 is a block diagram of yet another example of the characteristic compensation device. As illustrated in FIG. 10, the characteristic compensation device 86 is provided with the tunable dispersion compensator (TDC) 82, the polarization mode dispersion compensator (PMDC) 85, and the controller 83. For example, the tunable dispersion compensator 82 is connected to the optical output terminal 13 of the optical switch unit 42. For example, the polarization mode dispersion compensator 85 is connected to the tunable dispersion compensator 82 and the optical input terminal 14 of the optical switch unit 42.

The light signal output from the optical output terminal 13 of the optical switch unit 42 passes through the tunable dispersion compensator 82 and the polarization mode dispersion compensator 85 to be output to the optical input terminal 14 of the optical switch unit 42. The light signal may pass through the polarization mode dispersion compensator 85 first and then pass through the tunable dispersion compensator 82.

With the characteristic compensation device 86 illustrated in FIG. 10, the controller 83 sets the initial compensation value sent from the controller 6 of the transponder 25 in both the tunable dispersion compensator 82 and the polarization mode dispersion compensator 85. When the residual dispersion value and the value of the residual polarization position are sent from the controller 6 of the transponder 25, the controller 83 may calculate an initial compensation value based on each of the residual dispersion value and the value of the residual polarization position, and set the initial compensation value calculated based on the residual dispersion value in the tunable dispersion compensator 82 and the initial compensation value calculated based on the value of the residual polarization position in the polarization mode dispersion compensator 85. By connecting the characteristic compensation device 86 illustrated in FIG. 10 to the optical transmission apparatus 41, degradation of the transmission characteristic caused by chromatic dispersion and degradation of the transmission characteristic caused by polarization mode dispersion may be compensated for.

Figure 11:
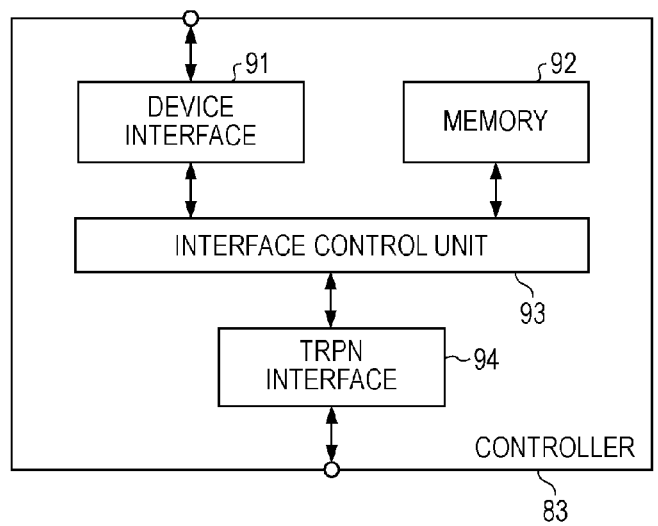
FIG. 11 is a block diagram of the controller in the characteristic compensation device illustrated in FIG. 8, FIG. 9, and FIG. 10.

FIG. 11 is a block diagram of a controller in the characteristic compensation device illustrated in FIG. 8, FIG. 9, and FIG. 10. As illustrated in FIG. 11, the controller 83 is provided with a device interface 91, a memory 92, a control unit 93, and a TRPN interface 94. The device interface 91, memory 92, and the TRPN interface 94 are connected to the control unit 93. The control unit 93 is realized, for example, by using a processor and a memory.

The TRPN interface 94 communicates with the controller 6 of the transponder 25 via the control terminal 16 of the optical transmission apparatus 41. The memory 92 holds information obtained as a result of communication with the controller 6 of the transponder 25. An example of information held by the memory 92 includes, for example, the initial compensation values of the tunable dispersion compensator 82 and the polarization mode dispersion compensator 85.

Alternatively, when monitor values, such as the residual dispersion value and the value of the residual polarization position, are sent from the controller 6 of the transponder 25, an example of the information held by the memory 92 includes, for example, the monitor values. The device interface 91 communicates with the tunable dispersion compensator 82 and the polarization mode dispersion compensator 85.

The control unit 93 controls the device interface 91, the memory 92, and the TRPN interface 94. The control unit 93 also sets the initial compensation values provided by the controller 6 of the transponder 25 in the tunable dispersion compensator 82 and the polarization mode dispersion compensator 85 via the device interface 91.

Alternatively, when monitor values such as the residual dispersion value and the value of the residual polarization position are sent from the controller 6 of the transponder 25, the control unit 93 may perform calculations based on the monitor values and obtain initial compensation values. The control unit 93 may set the obtained initial compensation values in the tunable dispersion compensator 82 and the polarization mode dispersion compensator 85 via the device interface 91.

Figure 12:
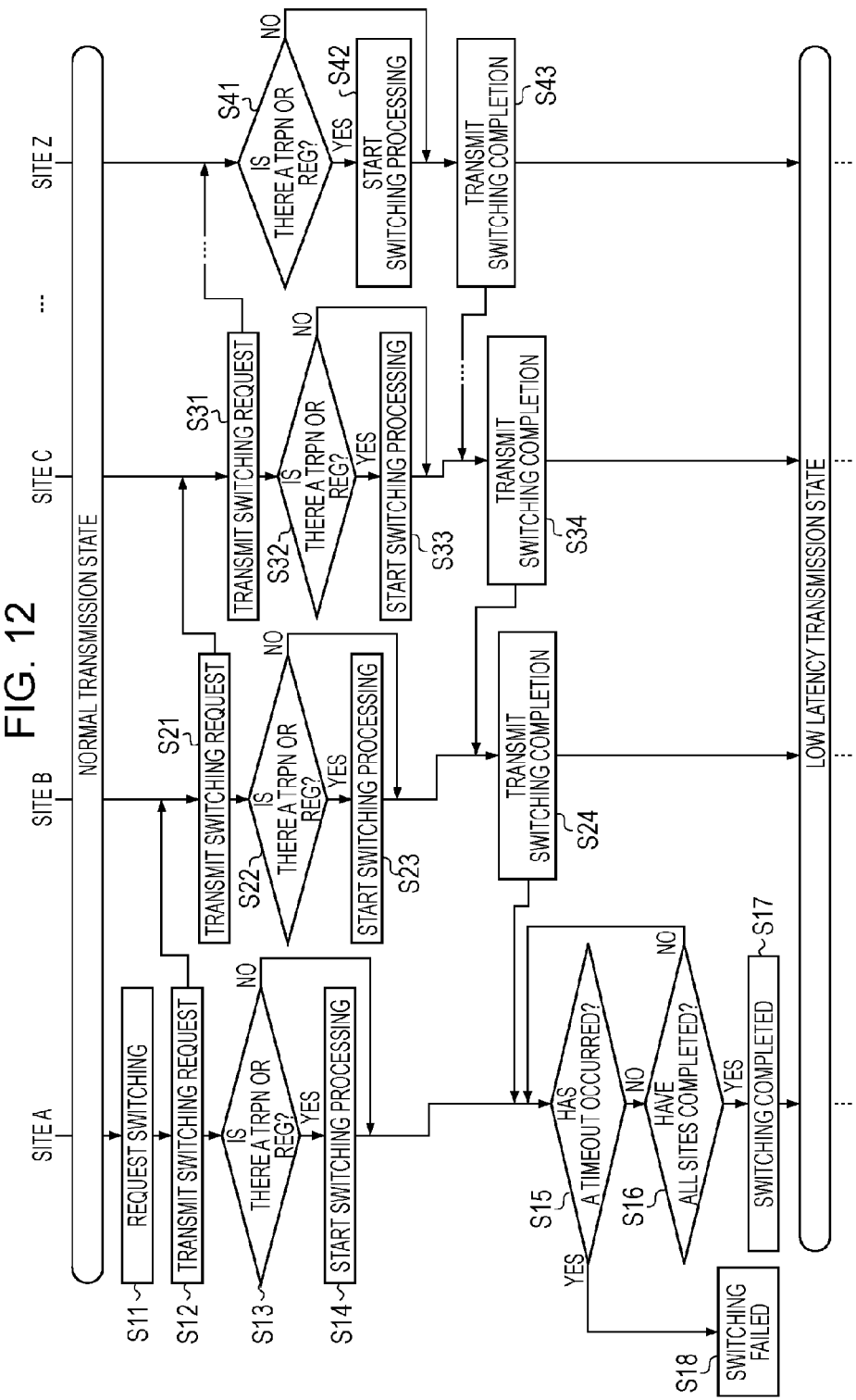
FIG. 12 is a flowchart of an example of a switching procedure for the optical transmission system illustrated in FIG. 4 to switch to a low latency transmission state.

FIG. 12 is a flowchart of an example of a switching procedure into a low latency transmission state in the optical transmission system illustrated in FIG. 4. It is assumed that the optical transmission system is in a normal transmission state. In a normal transmission state optical transmission apparatuses 21, 22, 23, and 24 at each site compensate for the optical characteristic through digital signal processing, and in a low latency transmission state the optical transmission apparatuses 21, 22, 23, and 24 optically compensate for the optical characteristic using the characteristic compensation device.

As illustrated in FIG. 12, for example, the optical transmission apparatus 21 of the site A receives a latency switching request message (step S11). The latency switching request may be set, for example, for the optical transmission apparatus 21 of the site A by the administrator of the optical transmission system.

When the latency switching request message is received, the optical transmission apparatus 21 of the site A transmits the latency switching request message to another site such as, for example, the optical transmission apparatus 22 of the site B via the monitoring control circuit (step S12). Then, the optical transmission apparatus 21 of the site A determines whether there is a transponder 25 or a regenerator 28 in the optical transmission apparatus 21 (step S13).

Herein, the regenerator 28 is included as a target of the determination because, from a viewpoint of compensating for degradation of the transmission characteristic caused by the dispersion or the like, the regenerator 28 is similar to the transponder 25 in the optical transmission apparatus. From the same viewpoint, since a so-called muxponder (MUXP), which includes a built-in multiplexer that multiplexes low speed signals, is also similar to the transponder 25 and the regenerator 28, a muxponder may be included as a target of the determination in the step S13.

When the optical transmission apparatus 21 of the site A has a transponder 25 or a regenerator 28 (step S13: Yes), the optical transmission apparatus 21 of the site A starts processing to switch from a state where compensation of the optical characteristic is carried out through digital signal processing to a state where the compensation is carried out by a characteristic compensation device (step S14). Then, the process waits until switching processing at other sites is completed. However, when both a transponder 25 and a regenerator 28 are not included in the optical transmission apparatus of the site A (step S13: No), the optical transmission apparatus 21 of the site A does not perform switching processing, and the process waits until switching processing at other sites is completed.

For example, when the optical transmission apparatus 22 of the site B receives a latency switching request message from another site via the monitoring control circuit, the optical transmission apparatus 22 of the site B transmits the latency switching request message via the monitoring control circuit to another site such as, for example, the optical transmission apparatus 23 of the site C (step S21). Then, the optical transmission apparatus 22 of the site B determines whether the optical transmission apparatus has a transponder 25 or a regenerator 28 (step S22).

When the optical transmission apparatus 22 of the site B has a transponder 25 or a regenerator 28 (step S22: Yes), the optical transmission apparatus 22 of the site B starts a process to switch from a state where compensation of the optical characteristic is done using digital signal processing to the state where compensation is carried out by a characteristic compensation device (step S23). Then, the optical transmission apparatus 22 of the site B waits until the switching process for the site at the transmission destination of the latency switching request message is completed. However, when both a transponder 25 and a regenerator 28 are not included in the optical transmission apparatus 22 of the site B (step S22: No), the optical transmission apparatus 22 of the site B does not perform the switching process and waits until the switching processing for the site at the transmission destination of the latency switching request message is completed.

For example, when the optical transmission apparatus 23 of the site C receives a latency switching request message from another site via the monitoring control circuit, the optical transmission apparatus 23 of the site C transmits the latency switching request message via the monitoring control circuit to another site such as, for example, the optical transmission apparatus 24 of the site Z (step S31). Then, the optical transmission apparatus 23 of the site C determines whether the optical transmission apparatus 23 of the site C has a transponder 25 or a regenerator 28 (step S32).

When the optical transmission apparatus has a transponder 25 or a regenerator 28 (step S32: Yes), the optical transmission apparatus 23 of the site C starts a process to switch from a state where compensation of the optical characteristic is done using digital signal processing to a state where compensation is done by the characteristic compensation device (step S33). Then, the optical transmission apparatus 23 of the site C waits until the switching process for the site at the transmission destination of the latency switching request message is completed. However, when both the transponder 25 and the regenerator 28 are not included in the optical transmission 23 of the site C (step S32: No), the optical transmission apparatus 23 of the site C does not perform a switching process and waits until the switching processing for the site at the transmission destination of the latency switching request message is completed.

For example, when the optical transmission apparatus 24 of the site Z receives a latency switching request message from another site via the monitoring control circuit, the optical transmission apparatus 24 of the site Z determines whether the optical transmission apparatus 24 has a transponder 25 or a regenerator 28 (step S41). When the optical transmission apparatus 24 has a transponder 25 or a regenerator 28 (step S41: Yes), the optical transmission apparatus 24 of the site Z starts a process to switch from a state where compensation of the optical characteristic is done using digital signal processing to a state where compensation is done by the characteristic compensation device (step S42).

Then, after the switching processing has completed, the optical transmission apparatus 24 of the site Z transmits a switching completion message, for example, to the optical transmission apparatus 23 of the site C corresponding to the transmission source of the switching request message (step S43). However, when both a transponder 25 and a regenerator 28 are not included in the optical transmission apparatus 24 of the site Z (step S41: No), the optical transmission apparatus 24 of the site Z transmits the switching completion message without performing a switching process (step S43).

When the switching process in the optical transmission apparatus 23 of the site C is completed and a switching completion message has been received, for example, from the optical transmission apparatus 24 of the site Z corresponding to the transmission destination of the switching request message, the optical transmission apparatus 23 of the site C transmits a switching completion message, for example, to the optical transmission apparatus 22 of the site B corresponding to the transmission source of the switching request message (step S34). When the switching process in the optical transmission apparatus 22 of the site B has completed and a switching completion message has been received, for example, from the optical transmission apparatus 23 of the site C corresponding to the transmission destination of the switching request message, the optical transmission apparatus 22 of the site B transmits a switching completion message, for example, to the optical transmission apparatus 21 of the site A corresponding to the transmission source of the switching request message (step S24).

When the switching process in the optical transmission apparatus 21 of the site A has completed and a switching completion message is received, for example, from the optical transmission apparatus 22 of the site B corresponding to the transmission destination of the switching request message, the optical transmission apparatus 21 of the site A determines whether a timeout has occurred (step S15). When a timeout has occurred (step S15: Yes), switching from the normal transmission state to the low latency transmission state has failed (step S18).

When a timeout has not occurred (step S15: No), the optical transmission apparatus 21 of the site A determines whether switching processing has completed in all the sites that are targeted to shift from the normal transmission state to the low latency transmission state (step S16). If there is a site where the switching process has not completed (step S16: No), the process waits until switching processing is completed in all of the sites that the operation targets. If a timeout occurs while waiting (step S15: Yes), switching from the normal transmission state to the low latency transmission state has failed (step S18).

When switching processing has completed in all the sites that are operation targets (step S16: Yes), the optical transmission apparatus 21 of the site A completes the switch to the low latency transmission state and transmits a switching completion message, for example, to the administrator of the optical transmission system (step S17). In the above manner, the optical transmission system switches to the low latency transmission state.

Figure 13:
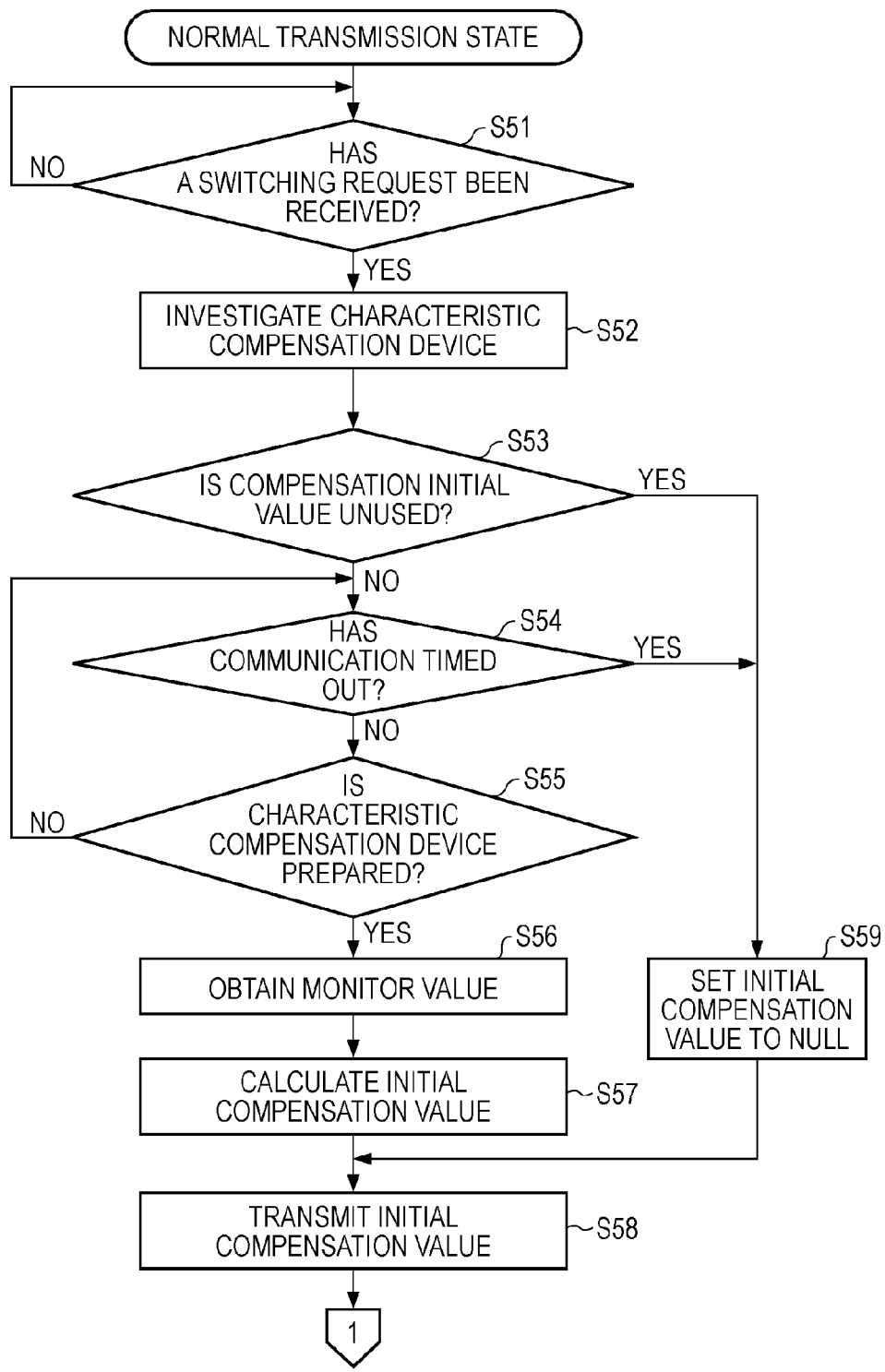
FIG. 13 is a flowchart of an example of the switching procedure for the optical transmission apparatus illustrated in FIG. 5 to switch to the low latency transmission state.
Figure 14:
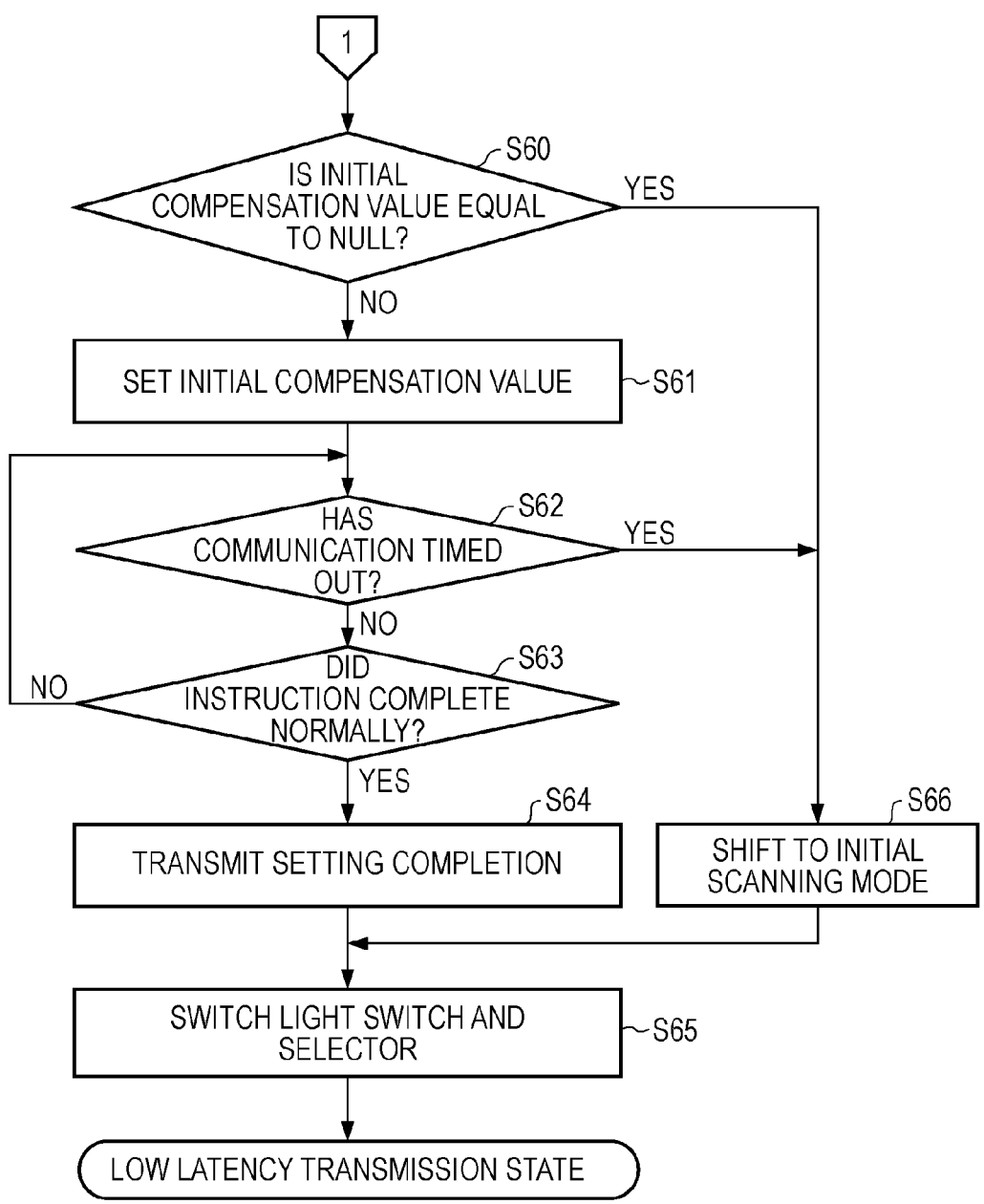
FIG. 14 is a flowchart of an example of a continuation of the flowchart illustrated in FIG. 13.
Figure 15:
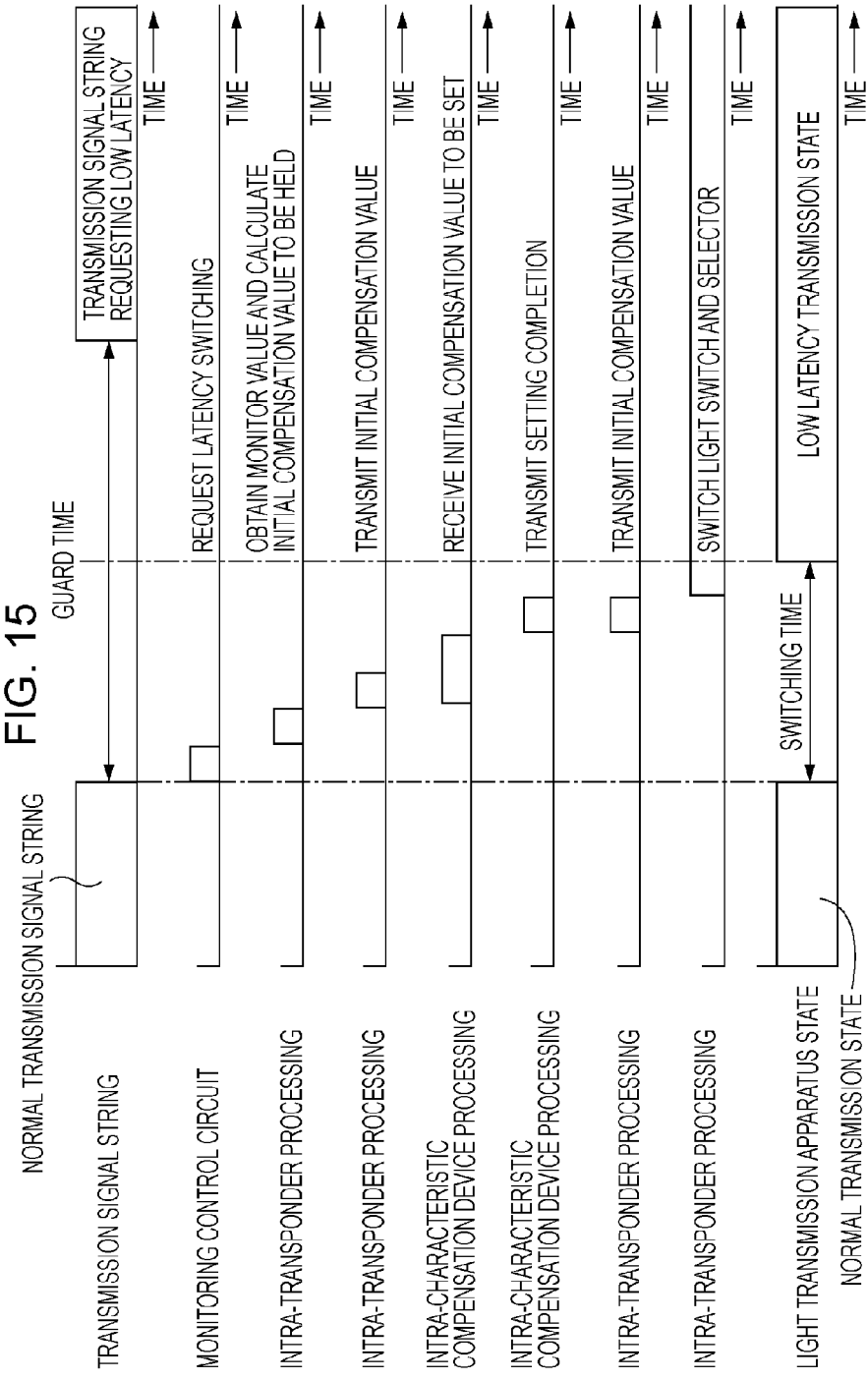
FIG. 15 is a time chart for when the optical transmission apparatus illustrated in FIG. 5 switches into the low latency transmission state.

FIG. 13 is a flowchart of an example of the procedure for the optical transmission apparatus illustrated in FIG. 5 to switch to the low latency transmission state. FIG. 14 is a flowchart that depicts an example of a continuation of the flowchart illustrated in FIG. 13. FIG. 15 is a time chart for when the optical transmission apparatus illustrated in FIG. 5 switches to the low latency transmission state.

As illustrated in FIG. 13 and FIG. 15, while the latency switching request message has not been received, for example, directly from the administrator of the optical transmission system or from the optical transmission apparatus at another site via the monitoring control circuit (step S51: No), the optical transmission apparatus 41 operates in the normal transmission state. When a latency switching request message is received (step S51: Yes), the optical transmission apparatus 41 uses the controller 6 to investigate whether the characteristic compensation device is connected to the optical switch unit 42 (step S52).

When a characteristic compensation device is connected, the optical transmission apparatus 41 determines whether the initial compensation value set in the characteristic compensation device has been used by the controller 6 (step S53). When the initial compensation value has been used (step S53: No), the optical transmission apparatus 41 uses the controller 6 to determine whether a timeout has occurred (step S54). When a timeout does not occur (step S54: No), the optical transmission apparatus 41 uses the controller 6 to determine whether preparation of the characteristic compensation device has been completed (step S55).

When preparation of the characteristic compensation device has not been completed (step S55: No), the optical transmission apparatus 41 waits until preparation of the characteristic compensation device has been completed. When the preparation of the characteristic compensation device is completed (step S55: Yes), the optical transmission apparatus 41 uses the controller 6 to obtain a monitor value from the digital signal processor 55 (step S56). The digital signal processor 55 is realized, for example, by using a processor and a memory. Then, the optical transmission apparatus 41 uses the controller 6 to calculate an initial compensation value based on the obtained monitor value (step S57), and the calculated value is held in the memory 72 of the controller 6 (see FIG. 7).

For example, when the tunable dispersion compensator is used as the characteristic compensation device, the controller 6 obtains, as a current residual dispersion amount, a compensation value $D_{MON}$ [ps/nm] from the digital signal processor 55 according to current digital signal processing. Then, the controller 6 calculates an initial compensation value $D_{TDC}$ [ps/nm] with respect to the tunable dispersion compensator by inverting the sign of the obtained compensation value $D_{MON}$, as represented by expression (1) below.

$$D_{TDC} = D_{MON} \times (-1) \quad (1)$$

For example, when a dispersion value is specified by the central wavelength currently being used in a general optical transmission apparatus (for example, 1550 nm with an optical transmission apparatus for the C band), the controller 6 calculates the initial compensation value $D_{TDC}$ in accordance with the wavelength of the light signal that is actually received by the tunable dispersion compensator. Expression (2) represents the calculation in this case.

$$D_{TDC} = D_{MON} \times (-1) + Ds_{TDC} \times (W_{TDC} - W_{Rx}) \quad (2)$$

In expression (2), $DS_{TDC}$ denotes the dispersion slope of the tunable dispersion compensator (units: ps/nm$^2$). $W_{TDC}$ denotes the specified wavelength (units: nm) of the tunable dispersion compensator. $W_{Rx}$ denotes the wavelength (units: nm) of the light signal that is actually received by the tunable dispersion compensator.

However, when the initial compensation value has not been used (step S53: Yes) or a timeout has already occurred before the preparation of the characteristic compensation device is checked in step S55 (step S54: Yes), the optical transmission apparatus 41 uses the controller 6 to set the initial compensation value to "Null" (step S59). In addition, when a timeout occurs while the process waits until the preparation of the characteristic compensation device in step S55 is completed (step S54: Yes), the initial compensation value is set to "Null" (step S59).

Subsequently, the optical transmission apparatus 41 uses the controller 6 to transmit the initial compensation value calculated in step S57 via the control terminal 16 to the characteristic compensation device (step S58). Alternatively, the optical transmission apparatus 41 uses the controller 6 to transmit "Null" that is set for the initial compensation value in step S59 via the control terminal 16 to the characteristic compensation device (step S58).

As illustrated in FIG. 14 and FIG. 15, the characteristic compensation device receives the initial compensation value via the controller 83 (see FIG. 8, FIG. 9, FIG. 10, and FIG. 11) and determines whether the initial compensation value is "Null" (step S60). When the initial compensation value is not "Null" (step S60: No), the characteristic compensation device uses the controller 83 to set the initial compensation value in the tunable dispersion compensator or the polarization mode dispersion compensator (step S61). Then, the characteristic compensation device determines whether a timeout has occurred (step S62).

When a timeout has not occurred (step S62: No), the characteristic compensation device determines whether the setting of the initial compensation value has completed normally (step S63). When the setting on the initial compensation value has not completed normally (step S63: No), the process waits until the setting completes normally. Then, when the setting of the initial compensation value has completed normally (step S63: Yes), the characteristic compensation device uses the controller 83 to transmit a setting completion message via the control terminal 16 to the optical transmission apparatus 41 (step S64).

However, when the initial compensation value is "Null" (step S60: Yes), the characteristic compensation device uses the controller 83 to shift to a mode in which the initial compensation value is obtained by scanning (step S66). Also, when a timeout has already occurred before whether completion of the setting of the initial compensation value is determined in step S63 (step S62: Yes), the characteristic compensation device shifts to a mode in which the initial compensation value is obtained by scanning (step S66). Also, when a timeout occurs while the process waits until the setting on the initial compensation value is completed normally in step S63 (step S62: Yes), the characteristic compensation device shifts to the mode in which the initial compensation value is obtained by scanning (step S66).

When a setting completion message is received from the characteristic compensation device, the optical transmission apparatus 41 switches the output-side optical switch 43, the input-side optical switch 44, the analog selectors 51 and 52, and the selector 56 to the H port (step S65). Also similarly, when the characteristic compensation device shifts to the mode in which the initial compensation value is obtained by scanning in step S66, the optical transmission apparatus 41 switches the optical switches 43 and 44 and the selectors 51, 52, and 56 to the H port (step S65). In the above manner, the optical transmission apparatus 41 is switched to the low latency transmission state.

When the optical transmission apparatus 41 normally switches from the normal transmission state to the low latency transmission state, in the optical transmission apparatus 41, the initial compensation value is used (step S53: No), and a timeout does not occur (step S54: No). Therefore, the flow does not normally proceed from step S53 and step S54 to step S59. To elaborate, the initial compensation value is not normally set to "Null".

In addition, when the optical transmission apparatus 41 normally switches from the normal transmission state to the low latency transmission state, before a timeout occurs in the characteristic compensation device (step S62: No), setting of an initial compensation value that is not "Null" completes normally (step S60: No, step S63: Yes). Therefore, the flow does not normally proceed from step S60 and step S62 to step S66. To elaborate, the characteristic compensation device does not normally shift to the mode in which the initial compensation value is obtained by scanning.

Switching of the optical transmission apparatus 41 to the low latency transmission state may in some cases affect a transmitter of an optical transmission apparatus at another site. For example, the optical transmission apparatus 41 on the transmission side may perform interleave processing on the transmission signal. In that case, the optical transmission apparatus 41 on the reception side performs deinterleave processing on the reception signal. With a configuration in which the optical transmission apparatus 41 on the reception side uses the digital signal processor 55 to perform deinterleave processing, if the state has switched to the low latency transmission state, deinterleave processing is not carried out. For that reason, after the state is switched to the low latency transmission state, an interleave encoder is not used in the optical transmission apparatus 41 on the transmission side.

Figure 16:
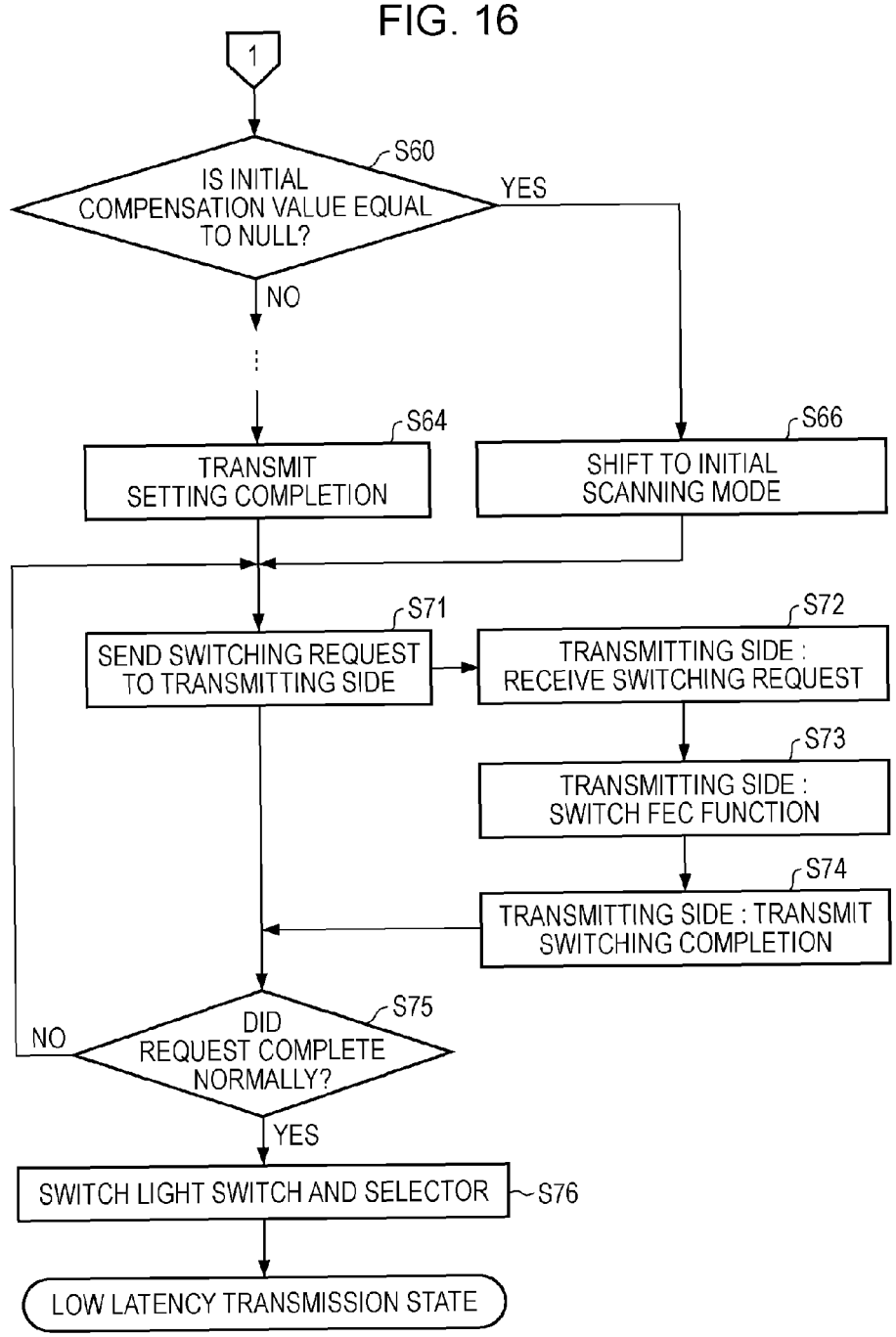
FIG. 16 is a flowchart of another example of the continuation of the flowchart illustrated in FIG. 13.

In view of the above, in the above-mentioned case, as in the flowchart illustrated in FIG. 16, the optical transmission apparatus 41 on the reception side may be made to operate simultaneously with the optical transmission apparatus 41 on the transmission side by using, for example, a circuit such as a monitoring control circuit. Besides interleave processing, by not performing digital signal processing via the digital signal processor 55 in the optical transmission apparatus 41 of the reception side, the optical transmission apparatus 41 on the transmission side is affected. The same affected processing applies to other processing.

FIG. 16 is a flowchart displaying another example of the continuation of the flowchart illustrated in FIG. 13. In the procedure to switch to the low latency transmission state, when the optical transmission apparatus 41 on the reception side is made to operate simultaneously with the optical transmission apparatus 41 on the transmission side, steps up to step S64 and up to step S66 of the flowchart illustrated in FIG. 16 are the same as step S51 to step S59 of FIG. 13 and step S60 to step S64 and step S66 of FIG. 14.

As illustrated in FIG. 16, when the characteristic compensation device transmits a setting completion message to the optical transmission apparatus 41 in step S64, the optical transmission apparatus 41 on the reception side transmits a switching request message to the optical transmission apparatus 41 on the transmission side (step S71). When the characteristic compensation device shifts to the mode in which the initial compensation value is obtained by scanning in step S66, the optical transmission apparatus 41 on the reception side also transmits a switching request message to the optical transmission apparatus 41 on the transmission side (step S71). Then, the optical transmission apparatus 41 on the reception side determines whether the switching requested by the optical transmission apparatus 41 on the transmission side has completed normally (step S75).

When the switching request message is received from the optical transmission apparatus 41 on the reception side (step S72), for example, the optical transmission apparatus 41 on the transmission side switches an FEC function so that interleave processing is not carried out (step S73). Then, the optical transmission apparatus 41 on the transmission side transmits a switching completion message to the optical transmission apparatus 41 on the reception side (step S74).

When the optical transmission apparatus 41 on the reception side is in a state where a switching completion message has not been received from the optical transmission apparatus 41 on the transmission side, the optical transmission apparatus 41 on the reception side determines that the switching of the optical transmission apparatus 41 on the transmission side has not completed (step S75: No). The optical transmission apparatus 41 on the reception side then transmits a switching request message again to the optical transmission apparatus 41 on the transmission side (step S71).

When the switching completion message is received from the optical transmission apparatus 41 on the transmission side, the optical transmission apparatus 41 on the reception side determines that the switching has completed normally in the optical transmission apparatus 41 on the transmission side (step S75: Yes). The optical transmission apparatus 41 on the reception side then switches the output-side optical switch 43, the input-side optical switch 44, the analog selectors 51 and 52, and the selector 56 to the H port (step S76). In the above manner, the optical transmission apparatus 41 on the reception side and the optical transmission apparatus 41 on the transmission side are switched to the low latency transmission state.

In addition, when the optical transmission apparatus 41 on the reception side causes the optical transmission apparatus 41 on the transmission side to operate simultaneously and normally switch state from the normal transmission state to the low latency transmission state, the flow does not proceed from step S53 and step S54 to step S59 in the optical transmission apparatus 41. To elaborate, the initial compensation value is not normally set to "Null".

In addition, when the optical transmission apparatus 41 normally switches from the normal transmission state to the low latency transmission state, the flow does not proceed from step S60 and step S62 to step S66 in the characteristic compensation device. To elaborate, the characteristic compensation device does not normally shift to the mode in which the initial compensation value is obtained by scanning.

According to the optical transmission apparatus 41 illustrated in FIG. 5, the initial compensation value set in the characteristic compensation devices 81, 84, and 86 is calculated based on monitor values such as the residual dispersion value and the value of the residual polarization position when the degradation of the transmission characteristic is compensated for through digital signal processing by the digital signal processor 55. As a result, the initial compensation value may be set in the characteristic compensation devices 81, 84, and 86 in a shorter time than when the initial compensation value is decided by scanning the wide variable chromatic dispersion bandwidth or scanning the polarization. Therefore, characteristic compensation via digital signal processing may be switched to optical characteristic compensation in a shorter time than when the setting of the initial compensation value is carried out by scanning.

In addition, in the optical transmission apparatus 41, the error correction function by the FEC decoder 57 and the FEC encoder 60 increases the transmission quality even despite the degradation of the transmission characteristic caused by the residual dispersion or the polarization mode dispersion, and also improves the Q value. Therefore, instead of carrying out digital signal processing by the optical transmission apparatus 41, the FEC decoder 57, and the FEC encoder 60, the degradation of the transmission characteristic may be optically compensated for by the tunable dispersion compensator and the polarization mode dispersion compensator in some cases.

Figure 17:
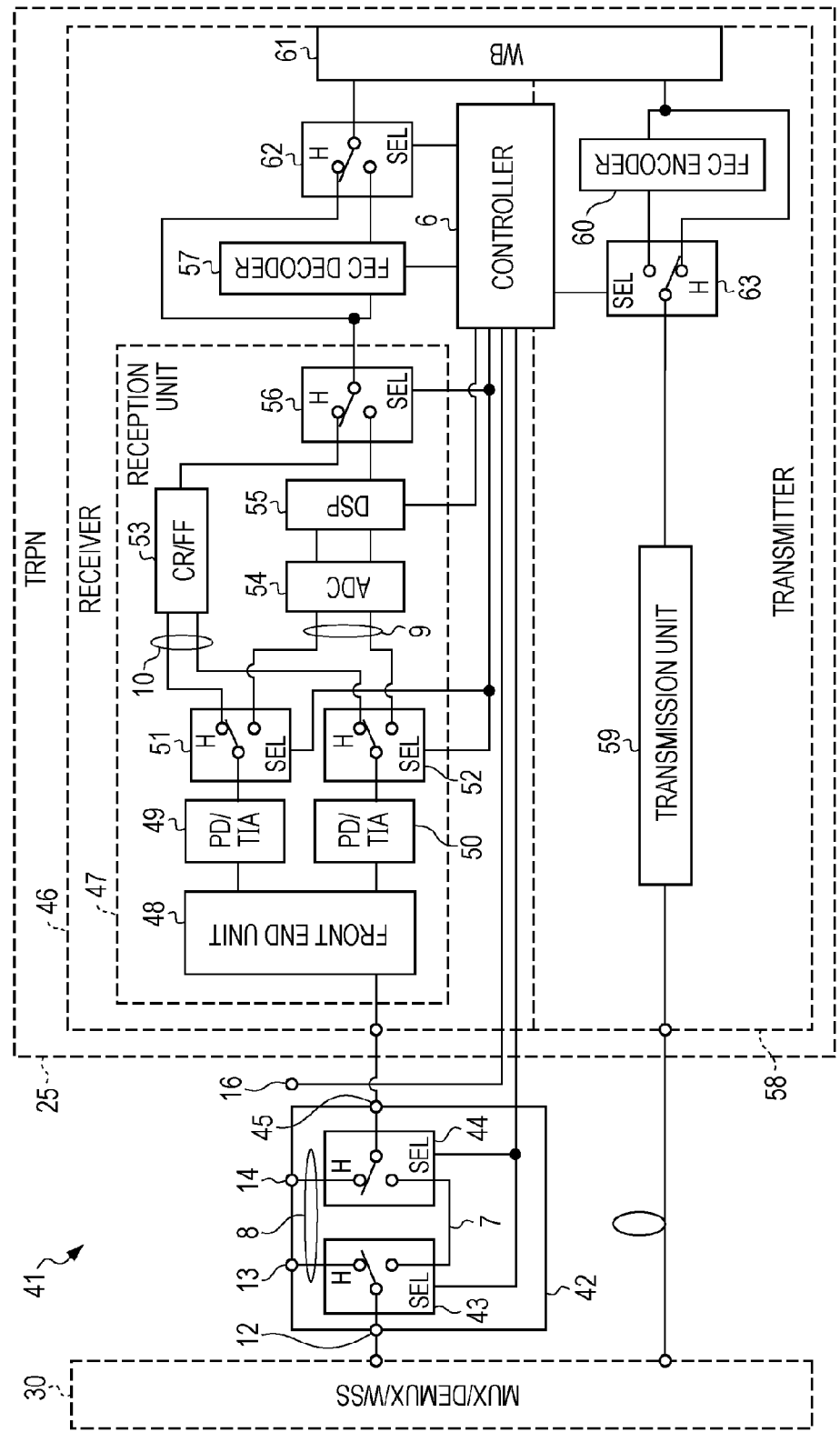
FIG. 17 is a block diagram of still another example of the main part of the optical transmission apparatus according to the embodiment.
Figure 18:
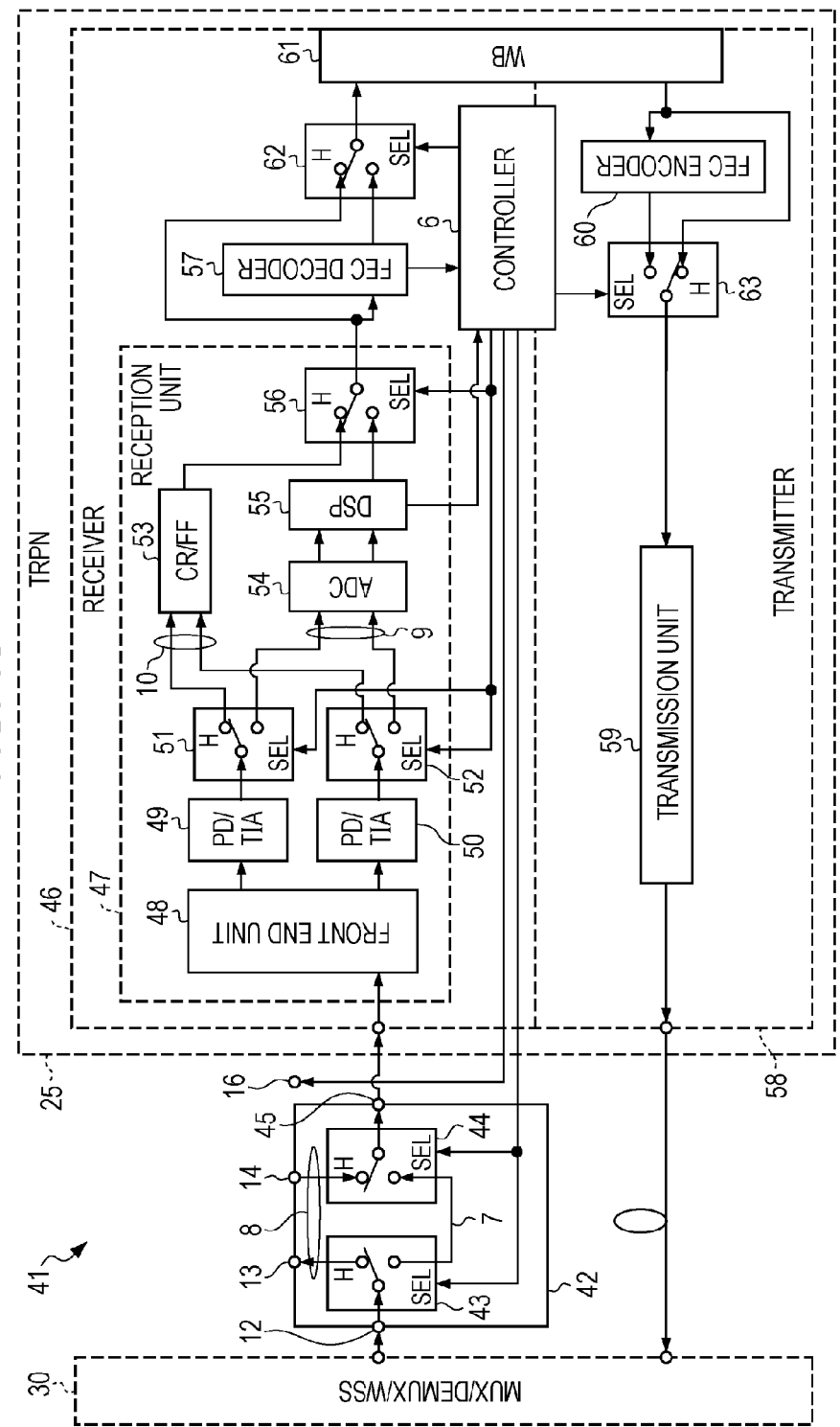
FIG. 18 is a block diagram of the flow of a signal in the optical transmission apparatus illustrated in FIG. 17.

FIG. 17 is a block diagram of yet another example of the main part of the optical transmission apparatus according to the embodiment. FIG. 18 is a block diagram of the flow of a signal in the optical transmission apparatus illustrated in FIG. 17. As illustrated in FIG. 17 and FIG. 18, the optical transmission apparatus 41 is provided with selectors 62 and 63 in a later stage of each of the FEC decoder 57 and the FEC encoder 60 in addition to the configuration of the optical transmission apparatus 41 illustrated in FIG. 5.

The selector 56 outputs either the output signal of the detour circuit 53 or the output signal of the digital signal processor 55. The FEC decoder 57 and one input terminal of the selector 62 (the H port) are connected to the output terminal of the selector 56. The other input terminal of the selector 62 (the L port) is connected to the FEC decoder 57. The control terminal (SEL) of the selector 62 is connected to the switch control unit 73 of the controller 6 (see FIG. 7). A reception unit of the wide band transceiver 61 is connected to the output terminal of the selector 62.

The transmission unit of the wide band transceiver 61 is connected to the FEC encoder 60 and one input terminal of (the H port) of the selector 63. The other input terminal of (the L port) of the selector 63 is connected to the FEC encoder 60. The control terminal (SEL) of the selector 63 is connected to the switch control unit 73 of the controller 6 (see FIG. 7). The output terminal of the selector 63 is connected to the transmission unit 59.

The switch control unit 73 of the controller 6 outputs a control signal to control the switching of each of the selector 62 of the receiver 46 and the selector 63 of the transmitter 58. The same control signal is input to the respective control terminals (SEL) of the selectors 62 and 63.

When the control signals input from the respective control terminals (SEL) of the selectors 62 and 63 are, for example, at the L level, the selector 62 transmits the signal output by the FEC decoder 57 to the reception unit of the wide band transceiver 61. The selector 63 transmits the signal output by the FEC encoder 60 to the transmission unit 59. To elaborate, the FEC function becomes enabled in the optical transmission apparatus 41.

However, when the control signals input from the respective control terminals (SEL) of the selectors 62 and 63 are, for example, at the H level, the selector 62 transmits the output signal of the selector 56 to the reception unit of the wide band transceiver 61. The selector 63 transmits the output signal of the transmission unit of the wide band transceiver 61 to the transmission unit 59. To elaborate, the FEC function becomes disabled in the optical transmission apparatus 41.

When the FEC function is disabled, so that the second path 8 is selected the controller 6 outputs a control signal, that is, a control signal at the H level, to the output-side optical switch 43 and the input-side optical switch 44. As a result, the transmission path of the light signal is switched to a path passing through the characteristic compensation device that is connected to the optical switch unit 42. To elaborate, instead of the FEC function, the transmission quality may be increased by the characteristic compensation device and the the Q value may be improved.

In addition, when the FEC function is disabled, the controller 6 may output a control signal so that the third path 9 is selected, that is, a control signal at the L level, to the analog selectors 51 and 52 and the selector 56. In this case, degradation of the transmission characteristic caused by dispersion is compensated for through digital signal processing by the digital signal processor 55.

Alternatively, when the FEC function is disabled, the controller 6 may output a control signal so that the fourth path 10 is selected, that is, a control signal at the H level, to the analog selectors 51 and 52 and the selector 56. In this case, instead of the FEC function, the transmission quality is increased by the characteristic compensation device that is connected to the optical switch unit 42 and the Q value is improved, and also degradation of the transmission characteristic caused by dispersion is compensated for.

In this manner, when the characteristic compensation device is used instead of the FEC function, the initial compensation value set in the tunable dispersion compensator 82 (see FIG. 8) or the polarization mode dispersion compensator 85 (see FIG. 9) of the characteristic compensation device is not calculated based on the monitor value from the digital signal processor 55. Therefore, the characteristic compensation device obtains the initial compensation value by scanning the wide variable chromatic dispersion bandwidth or scanning the polarization.

Figure 19:
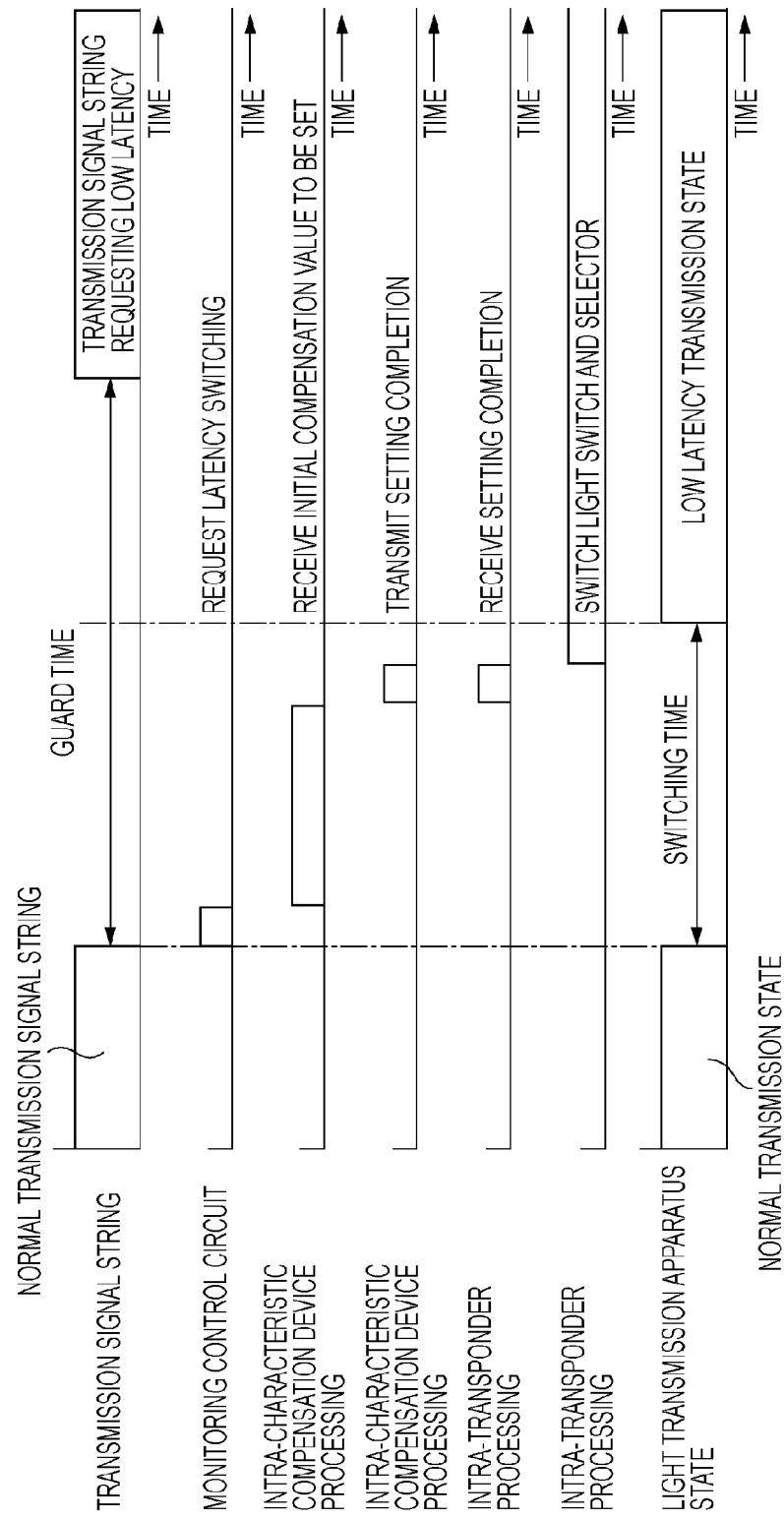
FIG. 19 is a time chart for when the optical transmission apparatus illustrated in FIG. 17 switches into the low latency transmission state.

FIG. 19 is a time chart for when the optical transmission apparatus illustrated in FIG. 17 switches to the low latency transmission state. The switching procedure to the low latency transmission state in the optical transmission apparatus illustrated in FIG. 17 is similar to the flowcharts illustrated in FIG. 13 and FIG. 14. However, when the optical transmission apparatus 41 normally switches from the normal transmission state to the low latency transmission state while the FEC function is disabled, the initial compensation value is not used by the optical transmission apparatus 41 (step S53: Yes). Therefore, the flow proceeds from step S53 to step S59, and the initial compensation value is set to "Null".

Also, when the optical transmission apparatus 41 normally switches from the normal transmission state to the low latency transmission state while the FEC function is disabled, the initial compensation value is "Null" in the characteristic compensation device (step S60: Yes). Therefore, the flow proceeds from step S60 to step S66, and the characteristic compensation device shifts to the mode in which the initial compensation value is obtained by scanning. Then, in step S65, the optical transmission apparatus 41 switches the output-side optical switch 43 and the input-side optical switch 44 to the H port. The analog selectors 51 and 52 and the selector 56 may be switched to the H port or may be switched to the L port.

According to the optical transmission apparatus 41 illustrated in FIG. 17, FEC functionality via digital signal processing, which has a high delay amount, may be disabled, and the transmission quality may be improved by using a tunable dispersion compensator or polarization mode dispersion compensator, which have a low delay amount, to improve the Q value. Therefore, it is possible to provide a service where the low latency is requested.

Instead of the selectors 56, 62, and 63, a logical circuit obtained by combining digital gates with each other may also be used. In addition, the selectors 62 and 63, which disable the FEC function, and a bypass path may be build in the FEC decoder 57 and the FEC encoder 60, respectively. To elaborate, instead of providing a bypass path on the outside of the FEC decoder 57 and the FEC encoder 60, when the FEC function is disabled, passing through a circuit that performs FEC decode or encode processing may be avoided.

The electronic processing unit may be configured to compensate for degradation of the transmission characteristic through digital signal processing based on a maximum likelihood sequence estimation (MLSE) instead of performing processing that compensates for degradation of the transmission characteristic caused by chromatic dispersion or polarization mode dispersion by using digital signal processing in the manner of a coherent receiver. The delay amount due to digital signal processing based on MLSE is greater than the delay amount for when an optical characteristic compensation device is used. Therefore, instead of digital signal processing based on MLSE, service where low latency is requested may be provided by using the optical characteristic compensation device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus, comprising:
   a first switch that switches an optical transmission path of a received light signal to one of a first path and a second path in the transmission apparatus;
   a photoelectric transducer that converts the light signal output from the first path or the second path into an electric signal;
   a second switch that provides the electric signal output from the photoelectric transducer to one of a third path and a fourth path;
   an electronic processing unit that is inserted into the third path and that performs processing to compensate for degradation of an optical transmission characteristic of the light signal on the optical transmission path, the electronic processing unit outputting compensation information;
   an optical characteristic compensation device that is inserted into the second path and that has set therein a compensation value based on the compensation information output from the electronic processing unit; and
   a controller that, when the first switch switches from the first path to the second path, sets the compensation value in the optical characteristic compensation device, and that performs control to switch, after setting the compensation value, the second switch from the third path to the fourth path.

2. The optical transmission apparatus according to claim 1, wherein the compensation information when the electronic processing unit compensates the transmission characteristic includes a chromatic dispersion amount, and the characteristic compensation device includes a tunable dispersion compensator.

3. The optical transmission apparatus according to claim 1, wherein the compensation information when the electronic processing unit compensates the transmission characteristic includes a polarization mode dispersion amount, and the characteristic compensation device includes a polarization mode dispersion compensator.

4. The optical transmission apparatus according to claim 1, wherein the compensation information when the electronic processing unit compensates the transmission characteristic includes a chromatic dispersion amount and a polarization mode dispersion amount, and the characteristic compensation device includes a tunable dispersion compensator and a polarization mode dispersion compensator.

5. A characteristic compensation method, comprising:
   first compensating a received light signal with digital signal processing;
   obtaining compensation information when degradation of a transmission characteristic of an optical transmission path of the received light signal is compensated for by using the digital signal processing with respect to an electric signal obtained by photoelectrically converting the light signal;
   calculating a compensation value for a characteristic compensation device that optically compensates for degradation of the transmission characteristic to start characteristic compensation, based on the compensation information with respect to the light signal;
   setting the compensation value in the characteristic compensation device; and
   switching from the state in which compensation is done on the received light signal using the digital signal processing to a state in which compensation is done on the received light signal using the characteristic compensation device after the setting of the compensation value is completed.

6. The characteristic compensation method according to claim 5, wherein the compensation information when compensation is done using digital signal processing includes a chromatic dispersion amount, and the characteristic compensation device includes a tunable dispersion compensator.

7. The characteristic compensation method according to claim 5, wherein the compensation information when compensation is done using the digital signal processing includes a polarization mode dispersion amount, and the characteristic compensation device includes a polarization mode dispersion compensator.

8. The characteristic compensation method according to claim 5, wherein the compensation information when the compensation is done using digital signal processing includes a chromatic dispersion amount and a polarization mode dispersion amount, and the characteristic compensation device includes a tunable dispersion compensator and a polarization mode dispersion compensator.

* * * * *